United States Patent
Fahlbusch et al.

(10) Patent No.: US 11,221,474 B2
(45) Date of Patent: Jan. 11, 2022

(54) PROTECTIVE DEVICE AND METHOD FOR PROTECTING MICROSCOPE COMPONENTS FROM CONTACT WITH A LIQUID

(71) Applicant: Carl Zeiss Microscopy GmbH, Jena (DE)

(72) Inventors: Ingo Fahlbusch, Göttingen (DE); Peter Schnüll, Gleichen (DE); Johannes Knoblich, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 17/240,010

(22) Filed: Apr. 26, 2021

(65) Prior Publication Data
US 2021/0341719 A1 Nov. 4, 2021

(30) Foreign Application Priority Data
Apr. 29, 2020 (DE) ..................... 10 2020 111 717.5

(51) Int. Cl.
G02B 21/00 (2006.01)
G02B 21/24 (2006.01)
G02B 21/33 (2006.01)

(52) U.S. Cl.
CPC ......... G02B 21/0088 (2013.01); G02B 21/24 (2013.01); G02B 21/33 (2013.01)

(58) Field of Classification Search
CPC ...... G02B 7/00; G02B 21/00; G02B 21/0088; G02B 21/02; G02B 21/24; G02B 21/248; G02B 21/33; G02B 21/362
USPC .................. 359/368–398, 506, 656, 665
See application file for complete search history.

(56) References Cited

U.S. PATENT DOCUMENTS

| 6,101,029 | A | 8/2000 | Gaul et al. | |
| 7,619,829 | B2 * | 11/2009 | Okazaki | G02B 21/33 |
| | | | | 359/368 |
| 7,852,552 | B2 * | 12/2010 | Harada | G02B 21/248 |
| | | | | 359/368 |
| 7,961,384 | B2 * | 6/2011 | Pirsch | G02B 21/02 |
| | | | | 359/368 |
| 8,144,396 | B2 | 3/2012 | Tomoika et al. | |
| 9,958,664 | B2 | 5/2018 | Scheps et al. | |

(Continued)

FOREIGN PATENT DOCUMENTS

| DE | 19746661 C1 | 5/1999 |
| DE | 10050825 A1 | 4/2002 |

(Continued)

OTHER PUBLICATIONS

Dorsch, Rainer, Search Report for DE102020111717.5 with English translation, dated Dec. 16, 2020, 9 pages.

*Primary Examiner* — Thong Q Nguyen
(74) *Attorney, Agent, or Firm* — LaBatt, LLC

(57) ABSTRACT

A protective device for protecting microscope components from contact with a liquid comprises at least one objective protection ring for arrangement around an objective, wherein the objective protection ring comprises an annular contact area for contacting the objective; and a stand protector with a drainage channel for draining a liquid. The objective protection ring comprises a lower ring area located below the contact area and protruding further outwards radially than the contact area in order to form a free space in the inward direction.

20 Claims, 16 Drawing Sheets

(56) References Cited

U.S. PATENT DOCUMENTS

2004/0004758 A1 1/2004 Dietzsch et al.
2019/0310454 A1* 10/2019 Shimada ................ G02B 21/02

FOREIGN PATENT DOCUMENTS

| DE | 202006014666 U1 | 12/2006 |
| DE | 102013011544 A1 | 1/2015 |
| EP | 2003481 A2 | 12/2008 |
| WO | 2002029469 A1 | 4/2002 |

* cited by examiner

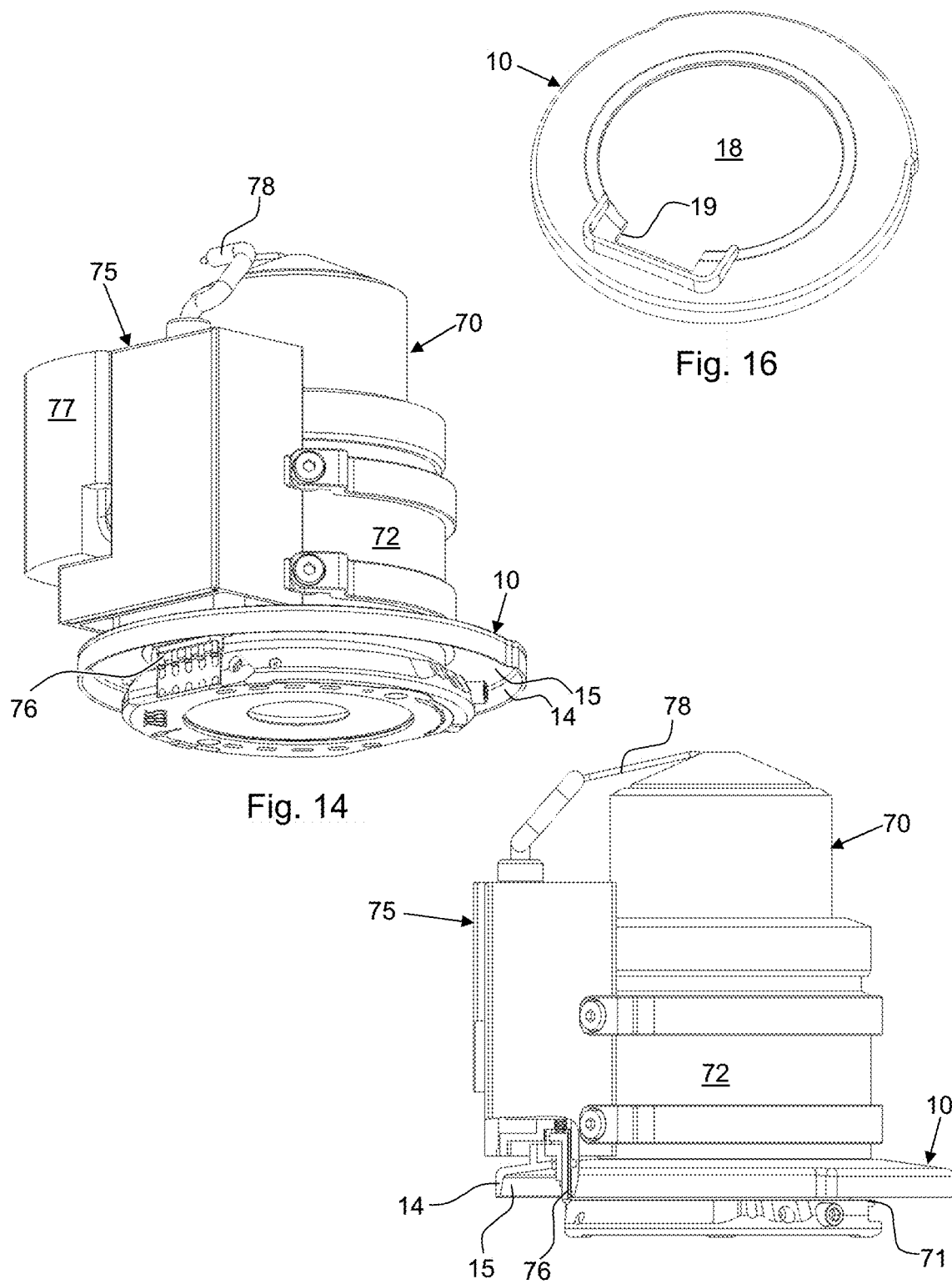

PROTECTIVE DEVICE AND METHOD FOR PROTECTING MICROSCOPE COMPONENTS FROM CONTACT WITH A LIQUID

REFERENCE TO RELATED APPLICATIONS

The current application claims the benefit of German Patent Application No. 10 2020 111 717.5, filed on 29 Apr. 2020, which is hereby incorporated by reference.

FIELD OF THE DISCLOSURE

The present invention relates to a protective device for protecting microscope components from contact with a liquid. The invention further relates to a method for protecting microscope components from contact with a liquid.

BACKGROUND OF THE DISCLOSURE

Liquids are used regularly in connection with the analysis of samples using microscopes; in the case of immersion media, for example, sample chambers filled with an aqueous solution or liquids for controlling the temperature of the sample are used. There is a general risk in this context that liquids leak and damage or contaminate microscope components. In the case of liquids containing hazardous materials, even small amounts of moisture can entail onerous cleaning operations or render microscope components useless. These risks apply in particular to inverted microscopes in which at least one objective, an objective revolver and corresponding components are arranged underneath a sample stage and thus can be particularly affected by leaking liquids. Different protective devices for providing protection from damage, i.e. protection from contact with a liquid, are known.

DE 20 2006 014 666 U1 describes a protective device in which sleeves that fit snugly against the objectives are employed, said sleeves extending from a front side of the objective over a large part of the surface of the casing. These flexible sleeves must be especially fitted to the contours of the respective objectives and border in a liquid-tight manner an objective-socket cover via which the liquid is further guided into a drainage channel. In order to ideally prevent an ingress of liquid, a direct, liquid-tight contact between the sleeve and the objective-socket cover is provided while a seamless configuration is ideally provided from the objective-socket cover to the drainage channel.

DE 10 2013 011 544 A1 describes a protective device in the area of the front optic of an objective. The protective device comprises a base plate with an orifice, said orifice being covered by a membrane that includes an objective lens opening. The base plate and the membrane restrict the accessibility of the objective and of the objective revolver and consequently impede the utilization of the same, for example when changing the objective.

EP 2 003 481 A2 describes an objective revolver that is preferably formed as one piece with a peripheral, protruding edge part. The edge part is intended to guide liquid into a drainage channel.

Instead of draining liquid via a drainage system, it is in principle also known to remove a liquid by suction. U.S. Pat. No. 8,144,396 B2, for example, describes a nozzle via which an immersion liquid can be suctioned from a front surface of an immersion objective.

A generic protective device for protecting microscope components from contact with a liquid comprises: at least one objective protection ring for arrangement around an objective, wherein the objective protection ring comprises an annular contact area for contacting the objective, optionally a revolver cover for arrangement on an objective revolver, and a stand protector with a drainage channel for draining in particular a liquid coming from the revolver cover.

Analogously, a generic method for protecting microscope components from contact with a liquid comprises the following steps: At least one objective protection ring is arranged around at least one objective, wherein the objective protection ring contacts the objective with an annular contact area. A revolver cover can optionally be arranged on an objective revolver. A stand protector is arranged on a stand of a microscope, in particular underneath the optional revolver cover, wherein the stand protector comprises a drainage channel for draining in particular a liquid coming from the revolver cover.

A generic protective device as described in the foregoing is known from WO 2002 029 469 A1. Sealing rings are arranged around the objectives in this disclosure. The sealing rings contact a flexible cover mounted on the objective revolver in a liquid-tight manner. A collar is fixed on the revolver support and terminates exactly at the edge of the cover. The collar contains a channel for draining liquid and thus protects the stand.

Although the described protective devices already reduce liquid ingress considerably, an even better protection from liquids is desired. At the same time, accessibility of microscope components should be preserved. For example, the Applicant is developing components which are fixed on an outer side of an objective, i.e. on the casing surface of an objective, which is incompatible with the sleeve disclosed in DE 20 2006 014 666 U1. Should the objective comprise control elements, for example a manually adjustable correction ring for a slide thickness correction, then it cannot be accessed through the sleeve disclosed in DE 20 2006 014 666 U1. A base plate as described in DE 10 2013 011 544 A1 also reduces the accessibility of the objective and precludes the use of certain accessory components, in particular when these components are intended to be arranged on an outer side of the objective.

A cleaning of all parts should be possible in the event of a serious incident, for example, if content from a biologically contaminated or infectious sample spills over the objective and the objective revolver. An objective protection in the form of a gaiter seal as widely employed in the prior art, however, is difficult to clean manually on site. In the event of a serious contamination, the entire damage-protection device can even be discarded. It is thus all the more important to prevent that the objective revolver or the objective interface should come into contact with a liquid, as otherwise it may be necessary to carry out a laborious decontamination of the entire microscope or even dispose of the same.

SUMMARY OF THE DISCLOSURE

The indication of a protective device and a method which safeguard microscope components particularly effectively against contact with a liquid while simultaneously avoiding or minimizing that the operation and accessibility of the microscope components are hindered in any way can be considered an object of the invention.

This object is achieved by means of the protective device and by means of the method described below.

A protective device for protecting microscope components from contact with a liquid and in a method according to embodiments of the invention comprises at least one objective protection ring for arrangement around an objective, wherein the objective protection ring comprises an annular contact area for contacting the objective; and a stand protector with a drainage channel for draining a liquid. The objective protection ring comprises a lower ring area located below the contact area and protruding further outwards radially than the contact area so as to form a free space in the inward direction.

A method according to an embodiment of the invention for protecting microscope components from contact with a liquid includes: arranging at least one objective protection ring around at least one objective, wherein the objective protection ring contacts the objective with an annular contact area; and arranging a stand protector on a stand of a microscope, wherein the stand protector comprises a drainage channel for draining a liquid, and wherein the objective protection ring comprises a lower ring area located below the contact area and protruding further outwards radially than the contact area so as to form a free space in the inward direction.

The free space formed between the objective protection ring and the adjacent objective-changer cover or between the objective protection ring and the adjacent stand protector may prevent a capillary effect. By means of this gap, which is open to the ambient area during operation and is thus filled with (ambient) air, it is avoided that capillary forces between the objective protection ring and the objective-changer cover or between the objective protection ring and the stand protector lead to an ingress of liquid. As a result of the dimensions of the gap, capillary forces do not play a significant role, i.e. the size of the gap is selected so that the capillary forces are insufficient to lift, for example, water over the height of the gap. In contrast, the approach of the solutions of the prior art described in the foregoing is to implement a liquid-tight contact between the objective protection ring and the revolver cover; however, small gaps can occur between these parts during operation so that a liquid can enter through such gaps by means of capillary forces. By comparison, the solution according to the invention achieves a superior liquid protection.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components:

FIG. 14 shows an objective of an example embodiment of a microscope in accordance with the invention;

FIG. 15 shows a side view corresponding to FIG. 14;

FIG. 16 shows a perspective view of an objective protection ring of an example embodiment of a protective device in accordance with the invention;

DETAILED DESCRIPTION OF EXAMPLE EMBODIMENTS

Figure 1:
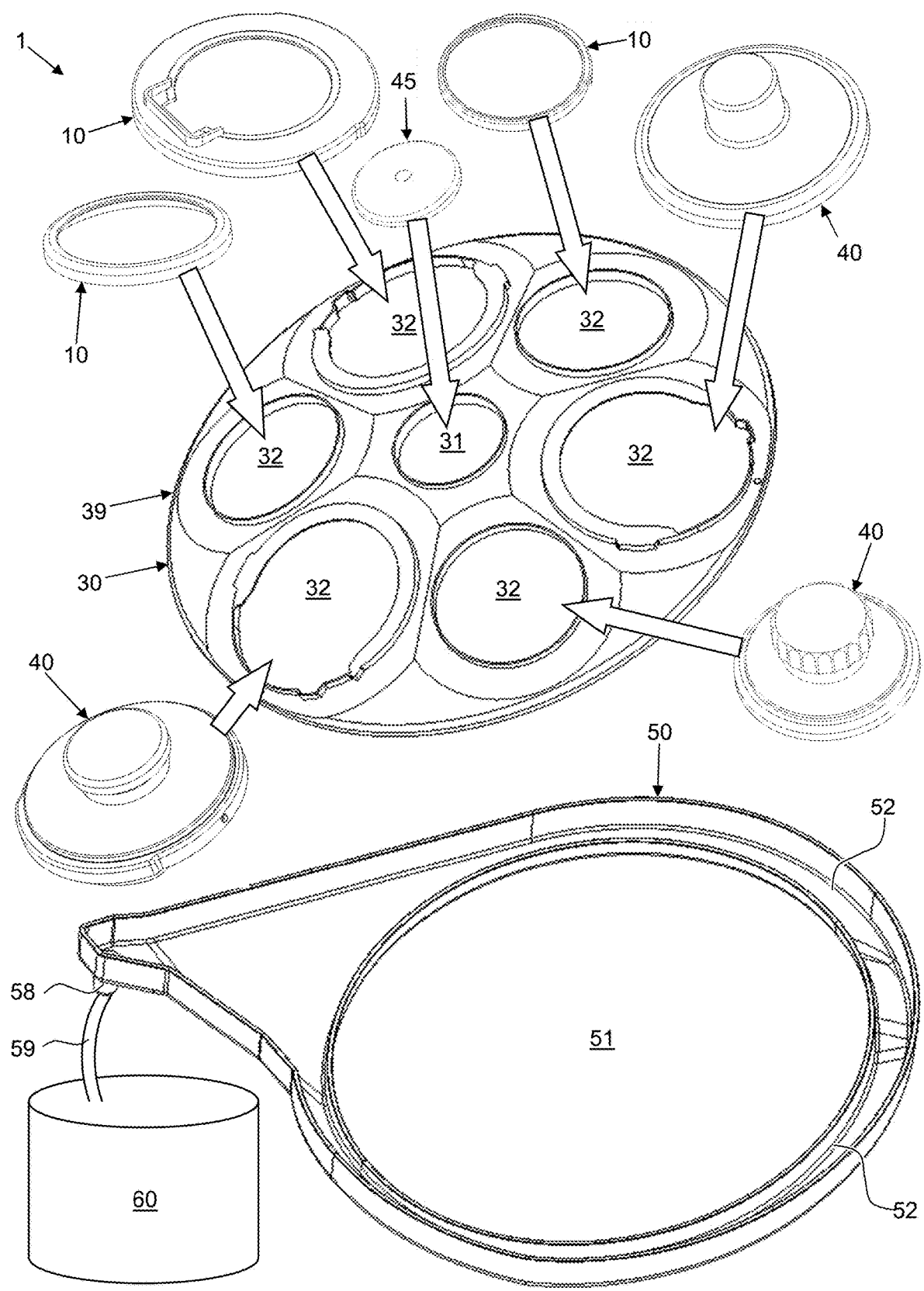
FIG. 1 is a schematic perspective illustration of an example embodiment of a protective device for a microscope in accordance with the invention.

As discussed above, indication of a protective device and a method which safeguard microscope components particularly effectively against contact with a liquid while simultaneously avoiding or minimizing that the operation and accessibility of the microscope components are hindered in any way can be considered an object of the invention.

This object is achieved by means of the protective device and by means of the method described below.

A protective device for protecting microscope components from contact with a liquid and in a method according to embodiments of the invention comprises at least one objective protection ring for arrangement around an objective, wherein the objective protection ring comprises an annular contact area for contacting the objective; and a stand protector with a drainage channel for draining a liquid. The objective protection ring comprises a lower ring area located below the contact area and protruding further outwards radially than the contact area so as to form a free space in the inward direction.

A method according to an embodiment of the invention for protecting microscope components from contact with a liquid includes: arranging at least one objective protection ring around at least one objective, wherein the objective protection ring contacts the objective with an annular contact area; and arranging a stand protector on a stand of a microscope, wherein the stand protector comprises a drainage channel for draining a liquid, and wherein the objective protection ring comprises a lower ring area located below the contact area and protruding further outwards radially than the contact area so as to form a free space in the inward direction.

OPTIONAL EMBODIMENTS

Several variants of the protective device according to the invention and of the method according to the invention are the object of the dependent claims and will be illustrated in the following description.

Objective Protection Ring with Free Space for the Prevention of a Capillary Effect An objective protection ring is understood to be an annular object arranged around an objective during operation. The objective protection ring can be formed as one piece or in principle also be assembled from a plurality of components. An inner side of the objective protection ring, at which the latter has its smallest diameter, can constitute the annular contact area with an objective. "Annular" is not necessarily to be understood as circular, the shape of the contact area rather being adapted to an outer shape of the objective and optionally to components attached thereto. For a sealing action at the contact area, the objective protection ring can be made of an elastic material or comprise such a material. The objective protection ring can in particular be designed as an elastic rubber or silicone ring or as a plastic ring. Electrically conductive parts can be incorporated in the same, as described in greater detail below.

While the contact area of the objective protection ring is intended to be liquid-tight, a liquid-tight contact between the objective and the revolver cover/stand protector, i.e. between the objective protection ring and the revolver cover/stand protector, is not necessarily required in order to prevent an ingress of liquid into the objective interface. This is rather primarily achieved by means of the free space. The free space is located below the contact area and radially inwards from the lower ring area, the lower ring area extending outwards and downwards from the contact area. More complex configurations of the objective protection ring are also possible provided that said free space is formed on its underside. While liquids can penetrate interstices between sealing elements by means of capillary effects when the sealing contact is not entirely liquid-tight, this undesired capillary action is prevented by the free space. It is noted here for the sake of clarity that an objective interface, for example a thread, does not produce an adequate liquid sealing in and of itself and therefore requires precisely the protection of the protective device from contact with a liquid.

In order to reduce or prevent an ingress of liquid via capillary action, a radial dimension of the free space can be greater than or equal to 0.5 mm, in particular greater than or equal to 0.7 mm. The free space is thus substantially larger than any gaps that may be disclosed in the aforementioned prior art. If the free space has different radial dimensions along its circumference, then the radial dimension indicated can denote the minimum radial dimension of the free space along its circumference.

In a mounted state, the free space can run in an annular manner around the entire circumference of the objective, thus preventing a capillary effect. The mounted state generally denotes the case where the protective device is fixed on a microscope, as is the case during a measurement operation of the microscope.

The at least one objective protection ring can be arranged at a, in particular axial, distance from the objective-changer cover or, in cases where an objective-changer cover is not used, from the stand protector. An ingress of liquid via capillary action is thereby reduced as long as the free space remains open. Alternatively, a contact with at least a part of the circumference of the objective protection ring can also be provided, the free space reducing a capillary action in this case as well. In the case of a contact, the free space can in particular be located radially inwards from the point of contact.

The objective protection ring can comprise a hydrophobic coating on an inner side and/or underside of the lower ring area. The hydrophobic coating thus borders the free space area and/or an ingress area to the free space and prevents an ingress of liquid into the free space. In contrast, a hydrophobic coating is optionally not provided on the outer side of the objective protection ring. Rather, a hydrophilic coating can be provided, additionally or alternatively, at least on parts of the outer side. A direction of the liquid drainage can be influenced or determined by the hydrophilic coating.

The outer side of the objective protection ring can slope downwards in a radially outward direction. Drained liquid is thus conveyed outward. It can in particular be provided that the objective protection ring does not comprise any areas that ascend in a radially outward direction in contrast to, for example, the shape of the gaiter seal of the prior art.

If the contact area of the objective protection ring has an undulating shape which protrudes radially to different degrees, then the feature that the lower ring area protrudes further than the contact area can be understood to mean that the lower ring area protrudes further outwards than the outermost point of contact of the contact area.

A height, i.e. axial extension, of the objective protection ring can be smaller than its ring width in a radial direction. The relatively small axial extension leaves the casing surface of the objective largely free so that control elements there remain accessible or auxiliary components can be mounted there. As the use of different auxiliary components is more and more frequent, it may be regarded advantageous if the objective protection ring leaves the casing surface largely free and can thus be used with a variety of auxiliary components of different shapes. By contrast, objective cover sleeves of the prior art cannot be used at all with auxiliary components or only with a specially configured auxiliary component.

The relatively large ring width of the objective protection ring ensures a relatively wide free space within, whereby an ingress of liquid under the objective protection ring via a capillary effect is prevented particularly efficiently. For example, an inner radius of the lower ring area can be between 20 and 30 mm and beget a radial dimension of the free space of 0.5 to 1 mm, whereby theoretical capillary ascents of less than 1 mm result. The lower ring area generally denotes the lowermost part of the objective protection ring, i.e. the end of the objective protection ring that is furthest away from the front of the objective (which points toward a sample during operation).

Objective-Changer Cover, in Particular Revolver Cover

An optional objective-changer cover of the protective device can be employed for a microscope with an objective changer. The objective-changer cover is positioned on the objective changer, which can be, for example, an objective revolver or an objective slider. The objective-changer cover can accordingly in particular be a revolver cover for covering an objective revolver or an objective-slider cover for covering an objective slider. For the sake of simplicity, the following description will refer only to the revolver cover and an objective revolver, although the following statements are intended to apply analogously to the objective-slider cover and an objective slider or to the objective-changer cover and an objective changer.

The revolver cover can in principle be made of any liquid-tight material and be in particular plate-shaped so as to be mountable on an objective revolver. The revolver cover comprises objective openings through which objectives can extend when mounted. In terms of their position, the objective openings correspond with the objective interfaces of the objective revolver.

The revolver cover can overlap with the objective protection rings in a radial direction of the latter. That is to say that the revolver cover can extend below the at least one objective protection ring further in the direction of a center of the objective protection ring than the lower ring area of said objective protection ring. The revolver cover thus delimits the corresponding free space in the downward direction.

The revolver cover can comprise a collar (inner collar) at each objective opening. The inner collar extends in the mounted state in an axial direction of the objective, i.e. upwards, or it has at last one such direction component. The inner collar can thus also delimit a portion of the free space, in particular inwards in the direction of the center of the objective protection ring in question. A height of the inner collar can be selected with respect to a radial dimension of the free space (i.e. with respect to the radial distance from the inner collar to the objective protection ring) in such a manner that (in the case of water under standard conditions) capillary forces can only cause a liquid ascent that is less than the height of the inner collar, in particular less than half the height of the inner collar.

An ingress of liquid via capillary action can be further reduced or excluded when a radial dimension of the free space is greater than an axial distance between the objective protection ring and the revolver cover, in particular greater than an axial distance between the lower ring area of the objective protection ring and the revolver cover.

Designs of Juncture Between the Revolver Cover and the Stand Protector

The revolver cover is located above the stand protector in its mounted state. The revolver cover can comprise an overhang in relation to the stand protector in a radial direction. A (in particular annular) gap is formed under the overhang in the direction of the stand protector, which prevents an ingress of liquid via a capillary effect. There is thus a clearance in the axial direction between the radially outermost area of the revolver cover and the stand protector. In particular, an inner radius of the overhang (and thus an outer radius of the gap) can be between 80 and 90 mm and beget a radial dimension of the gap of between at least 0.5 and 1 mm so that theoretical capillary ascents of less than 1 mm result. The gap can also be larger in a radial direction or sections of the same can be larger, for example 5 mm or more in places. A rotation can thus occur without any problems in cases where an inner component is not circular, i.e., for example, when parts of the same protrude outwards so that the gap is smaller in the radial direction at the location of said parts.

The revolver cover can comprise a collar (outer collar) that projects upwards in a radially outward direction. The outer collar protrudes upwards or obliquely upwards, i.e. it contains an axial direction component. An objective revolver on which the revolver cover is positioned typically has an inclined orientation, i.e. the axis of rotation or symmetry of the revolver is inclined in relation to the optical path of the microscope, i.e. is oblique to the optical axis of a currently selected objective. When mounted on an inclined objective revolver, the revolver cover thus has the same tilted orientation so that, due to the outer collar, a drainage of liquid occurs on a lowermost side of the revolver cover toward the stand protector. A liquid can thus flow over the outer collar down to the stand protector at the lowermost side while the outer collar prevents an overflowing of the liquid on other sides. In order to allow a drainage of the liquid on the lowermost side, the outer collar should optionally not extend parallel to the axis of rotation of the objective revolver, but rather obliquely outwards with respect to said axis of rotation.

The revolver cover can comprise hydrophobically coated areas for blocking an ingress of aqueous liquid. Hydrophilically coated areas for the draining of aqueous liquid can also be employed. The revolver cover can in particular at least partially have a hydrophobic coating in areas which border a section of the free space in the direction of the objective protection ring and/or areas which form a part of the gap towards the stand protector. Alternatively or additionally, the revolver cover can at least partially comprise a hydrophilic coating on its outer side (in particular in areas not covered by an objective protection ring). Liquids are thus guided away from the at least one objective protection ring in the direction of the stand protector.

Stand Protector

The stand protector can denote a cover intended to protect a microscope stand and microscope components arranged thereon from being damaged by a liquid. If a revolver cover is used, the stand protector in the mounted state is located below the revolver cover and receives liquid drained therefrom. In microscopes without an objective changer, the stand protector is arranged directly adjacent to the objective protection ring and receives the liquid drained therefrom. In the interest of a succinct description, variants of the invention with a revolver cover are described in the following, it being understood that the revolver cover can be omitted in variations of said variants in which the objective protection ring thus takes its place; that is to say that descriptions of positions and distances between the stand protector and the revolver cover are to be understood as descriptions of positions and distances between the stand protector and the objective protection ring in variants of the invention without the revolver cover.

The stand protector can comprise the shape of a ring or ring segment that extends around the objective revolver or around the stand. Besides this shape, the stand protector can comprise further components or differently shaped areas for further liquid drainage. If the optional objective revolver is rotated, the revolver cover is rotated with it while the stand protector remains stationary, i.e. does not rotate. However, a stand protector that rotates together with the aforementioned elements is in principle also possible.

The drainage channel of the stand protector can have the shape of a ring or ring segment and in particular extend in the mounted state around the objective revolver. The drainage channel here can be arranged at least partially directly underneath an outer edge of the revolver cover and be overlapped by this outer edge in a radial direction. A liquid from the revolver cover is thus conducted directly into the drainage channel.

An outer edge or an outer collar of the revolver cover can be shaped in such a manner that, in the mounted state, liquid is drained solely via a lowermost side/point of the revolver cover. The stand protector does not have to have a circumferential drainage channel in this case; rather, it is sufficient to provide the drainage channel at least on the lowermost side. Opposite the lowermost point of the outer collar of the revolver cover, the stand protector can, conversely, either not protrude radially beyond the revolver cover or possess a recess or an interruption. A recess denotes a reduced axial dimension of the stand protector; in particular, the drainage channel can be shallower here. In the case of an interrupted drainage channel, a drainage channel is omitted at the site of interruption. Access to the uppermost objective (located in the optical path of the microscope) and to the objective revolver in the area of this optically active objective is thus improved. In particular, access to a DIC slot (slot for a differential interference contrast slide) can thus be achieved or improved. By contrast, a DIC slot is generally covered in solutions of the prior art.

The stand protector can be arranged so that a recess or interruption of the drainage channel is located by the objective currently in an optical path of the microscope. In other words, the recess or interruption can be located at an end lying opposite the drain. The recess or interruption improves access to the objective currently being used and to corresponding components, for example a DIC slot. The objective revolver can be oriented so that, of all objectives, the objective located in the optical path is located at the highest point. By means of this inclined orientation, an outer collar of the revolver cover can define a groove which guides liquid along the outer collar around the objective revolver to a point or area next to the lowermost objective, where a draining of the liquid in the direction of the stand protector occurs. As no liquid or hardly any liquid flows over the outer collar of the revolver cover by the uppermost objective, it is not necessary for the stand protector to protrude radially beyond the revolver cover there. The drainage channel of the stand protector can thus possess an interruption here, i.e. the revolver cover is not completely surrounded by the stand protector in a circumferential direction. The drainage channel consists rather of two separate grooves, which both lead to the drain or to respective drains of the stand protector. Instead of said interruption in the circumferential direction, it can also be provided that a continuous drainage channel is designed to be shallower next to the uppermost objective. The stand protector thus does not protrude as far downwards next to the uppermost objective and forms a recess there. Both such a recess as well as an interruption facilitate access to, for example, a DIC slot.

The stand protector can comprise a recess or interruption for accessing a DIC slot on a side that lies opposite a drain. The drain is connected to the drainage channel in order to drain liquid therefrom.

A collection container can be fluidly connected to the/a drain of the stand protector, in particular via a drain tube. The collection container can also collect larger amounts of liquid drained via the protective device.

The stand protector can optionally have a drip edge on its underside, in particular on its outer edge. The drip edge can be formed circumferentially and surround the objective revolver in the shape of a ring or ring segment. The stand protector or the drip edge can lie radially further outwards than microscope components located thereunder or than the stand. These components or the stand are thus not struck by liquid flowing over the outer edge of the stand protector or dripping from the drip edge. The drip edge can extend in particular on the underside of the drainage channel and along the drainage channel. For improved accessibility of a filter or DIC slot, the drip edge in the area of the optically active objective can have a shorter length than in other sections of the drip edge or be omitted there.

Interface Covers for Objective Revolver Positions not in Use

An interface cover denotes a cover that is mountable in an objective opening of the revolver cover when an objective is not in use at said objective opening. Each interface cover comprises a mounting area which engages the objective opening in the mounted state. A plurality of interface covers with different mounting areas can be provided, for example, with a thread, a bayonet mount or a bayonet connector. Alternatively or additionally, a mounting area can also comprise magnets.

The interface cover can comprise an overhang area which can be formed like the radially protruding ring area of the objective protection ring and which can form a corresponding free space. In the mounted state of the interface cover, the overhang area can extend (axially) from the objective opening and project radially over the mounting area and the objective opening. The overhang area can be located at a distance from the revolver cover in the mounted state. The overhang area can thus form a gap or free space in an inward direction, which prevents a capillary effect.

The interface cover can optionally comprise electrical contacts for connection to contacts of the objective changer, for example of an objective revolver. An automatic component recognition (ACR) can occur by this means, to which end the interface cover can comprise a memory with identification data that can be read via the electrical contacts.

Microscope

The invention also relates to a microscope with the described protective device. The microscope can be, for example, a light microscope that works in particular with light in the UV, IR or visible spectral range. In principle, the protective device against liquid contact is not dependent on the measuring principle of the microscope so that other microscope types can also benefit from the protective device.

The microscope can in particular comprise a stand, at least one objective and the protective device. The microscope can further comprise an optional objective changer, for example an objective slider or an objective revolver. Further components such as a light source and a camera can optionally be provided.

A stand can be understood to denote a microscope component that is adapted to support the objective revolver and/or further microscope components, for example an illumination unit, a tube or a camera. The stand can in particular also serve to stand the microscope on a surface.

The objective protection ring can extend around the connecting end of the corresponding objective and otherwise leave a casing surface of the objective free. For example, the objective protection ring can be formed so that at most 20%, in particular at most 15%, of the casing surface is covered. The connecting end of the objective can denote the end of the objective that is mounted on the objective revolver. Broadly speaking, the objective protection ring can be located along an axial length of the objective within a third or quarter of this length starting from the connecting end. The greater part of the casing surface thus remains accessible, for example for control elements like a manually controllable correction ring or auxiliary components that can be mounted on the objective, for example an autoimmersion unit developed by the Applicant.

The microscope can in particular be an inverted microscope. In this type of microscope, the objective revolver and the objective or objectives are arranged underneath a specimen to be analyzed. In the event of an accidental leakage of liquid in the area of the specimen, there is thus the risk of liquid damage or liquid contact at the interface between the objective and the objective revolver or at other components on the objective revolver or on the stand. In addition to inverted microscopes, the protective device can, however, also be utilized with upright microscopes. In an upright arrangement, the described drainage channel does not function as a drain. In the event of a water spray, the protective device can also preclude that adhesive drops are pulled into, for example, the interfaces between the objectives and the objective revolver via capillary effects.

General Features

The microscope components protected from liquids by the protective device can in particular be one or more of the following: an interface between an objective and the objective revolver; the objective revolver; components or openings on the objective revolver or on the stand; a filter slot or in particular a DIC slot on the objective revolver or on the stand.

In principle, the liquid from which protection is provided can be any liquid, for example an oil, water, a solution containing water or oil, a mixture or an emulsion. The liquid can be, for example, leaked immersion liquid, a sample medium or a liquid surrounding the sample medium.

The indications "upwards" and "downwards" relate to the operation of an inverted microscope. "Upwards" thus denotes the direction towards the sample or towards the front of the objective. Conversely, "downwards" denotes the opposite direction, i.e. away from the sample during operation.

Indications such as "radially outwards" or "inwards" relate to the component being described. For example, in the case of the objective protection ring, the radially outward direction denotes an outward direction away from the center of the ring. A direction from the ring towards the center is thus designated as "inwards" and the opposite direction as "outwards". In the case of the revolver cover, such indications accordingly relate to a center of the revolver cover or to an axis of rotation of the covered objective revolver. The indication "axial" relates to a direction parallel to the axis around which an objective protection ring extends (during operation, this is the longitudinal axis of the corresponding objective) or to a direction parallel to an axis of rotation of the objective revolver.

The objective revolver can be understood to denote an apparatus which can support one or more objectives and which is movable, in particular rotatable, in order to move an objective into or out of the optical path of the microscope. The objective revolver can optionally also be designed to support further components other than objectives.

The objective protection ring, the revolver cover and the stand protector can be different components. To facilitate mounting, the objective protection ring and the revolver cover may be separate components. The revolver cover and the stand protector can also be separate components or they can be formed as one piece or be rigidly connected to one another. By means of a radially overlapping arrangement, similar to roof shingles, even larger amounts of liquid can be drained. Problematic capillary effects between the overlapping components are avoided by means of the described designs. In particular, the dimensions of the free gap between the overlapping components can be selected so that, even in the event of a gushing leakage of liquid, the free gap is not covered with liquid over its entire circumference. A capillary effect is thereby further reduced.

In order to provide electromagnetic shielding, one or more of the described components of the protective device, in particular the objective protection ring, the revolver cover and/or the stand protector, can optionally further comprise electrically conductive parts. In particular when electronic auxiliary components are provided on the objective barrel or in the case of electronically controlled motorized objectives, such shielding is all the more relevant in order to meet EMC standards (electromagnetic compatibility). The electrically conductive parts can in particular be made of metal. These parts can be, for example, a metal coating or metal particles distributed in the material of the components. The objective protection ring can be, e.g., an elastic rubber or silicone ring or a plastic ring provided with said electrically conductive parts. This way, it is possible to provide an at least partial protection of electrical components from surge damage caused by a user, which can occur in particular via electrostatic discharges. The electrically conductive parts can optionally be connected to conductive parts of the housing of the microscope.

The characteristics described as additional features of the protective device, if implemented as intended, also yield variants of the method according to the invention. Conversely, the protective device can also be configured to carry out the described method variants.

Example Embodiments of FIGS. 1 to 18

Example embodiments of the protective device 1 according to the invention which provide microscope components with a protection from liquid contact are described in the following with reference to FIGS. 1 to 18.

FIG. 1

As shown in FIG. 1, the protective device 1 comprises, inter alia, a plurality of objective protection rings 10, a revolver cover 30 and a stand protector 50. The revolver cover 30 comprises a plurality of objective openings 32 and, in an operational state, is positioned on an objective revolver. The locations of the objective openings 32 correspond to objective positions of the objective revolver so that each objective can extend through a corresponding objective opening 32. The objective protection rings 10 prevent an ingress of liquid between objectives and the revolver cover 30, as described in greater detail below.

Interface covers 40 are provided for objective openings 32 which are not currently occupied by an objective. An interface cover 40 can be mounted in an objective opening 32 and prevents liquid from entering the same. The objective openings 32 can have different shapes in order to accommodate objectives of different shapes. The interface covers 40 can thus also differ in shape. Likewise, the objective protection rings 10 can also have different sizes and/or shapes.

The revolver cover 30 can optionally comprise an opening (rotation-axis opening 31) lying on an axis of rotation of the objective revolver. For example, a fixation of the revolver cover 30 can occur via the rotation-axis opening 31. The revolver cover 30 can be readily detached and removed in this manner, for example for cleaning purposes. The rotation-axis opening 31 can also be provided with a cover (rotation-axis cover 45) in order to prevent an entry of liquid into the rotation-axis opening 31. The rotation-axis cover 45 can be designed in the same manner as described in greater detail below with respect to the interface covers 40. In alternative designs, the rotation-axis opening 31 is omitted. In these cases, the revolver cover 30 can be fixed, for example, by means of magnets or clips.

The stand protector 50 comprises an opening 51 so that the stand protector 50 can be configured around a stand or an objective revolver of the microscope. A drainage channel 52, in which liquid that reaches the stand protector 50 is collected and drained, extends around the opening 51 in a circumferential direction. The drainage channel 52 is annular in this example. Alternatively, the drainage channel 52 does not have to form a closed shaped and the opening 51 does not have to be enclosed in a radial direction, as described in greater detail below with regard to further example embodiments. The drainage channel 52 leads to a drain 58 in the stand protector 50, for example an opening on the underside of the stand protector 50. A collection container 60 is connected to the drain 58, for example via a drain tube 59.

FIG. 2

Figure 2:
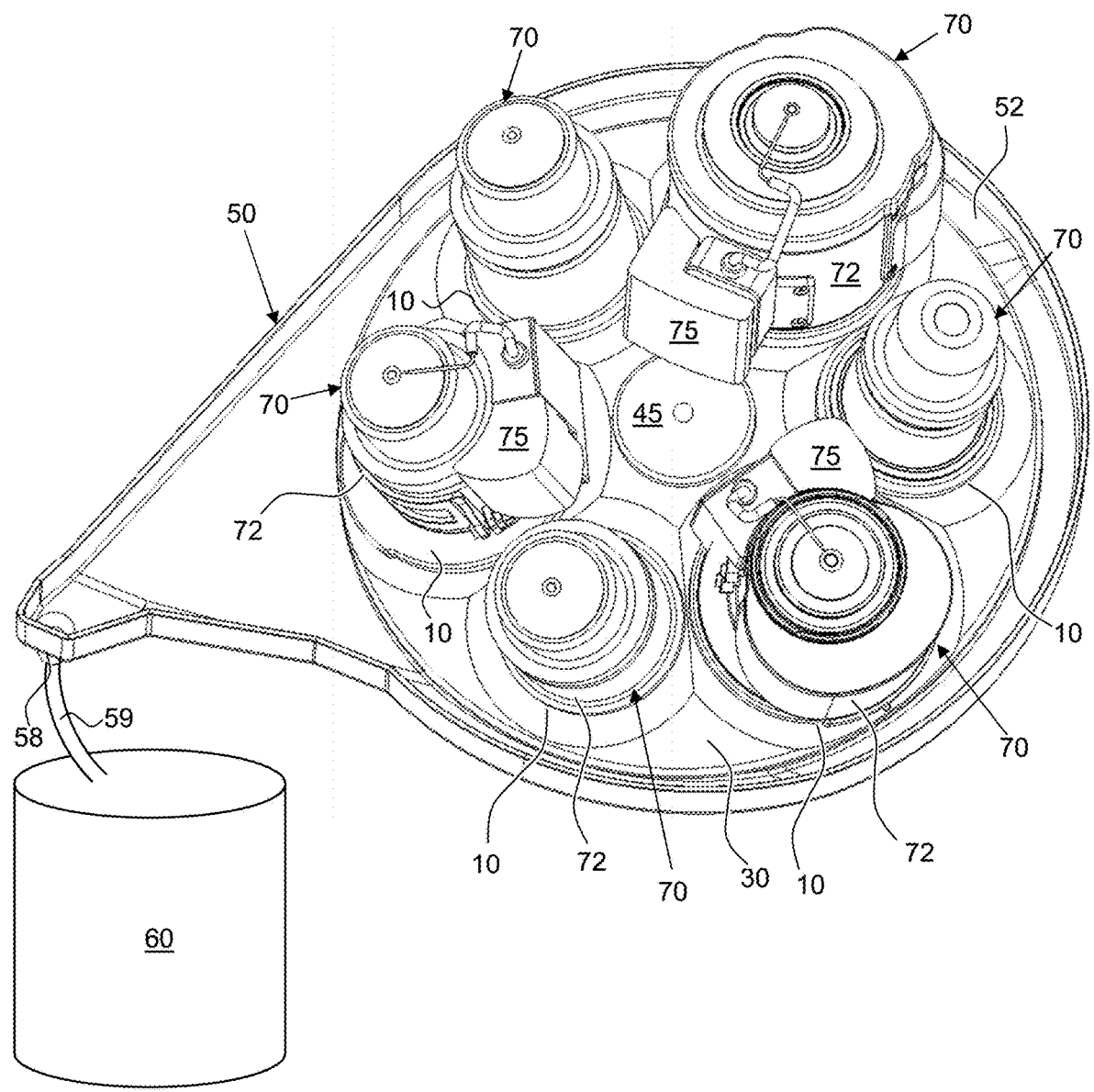
FIG. 2 shows the protective device of FIG. 1 in an assembled state.

FIG. 2 shows the protective device 1 of FIG. 1 in an assembled state with a plurality of objectives 70.

Should liquid reach one of the objectives 70 during operation, then it flows from the objective 70 to the objective protection ring 10, further to the revolver cover 30, from there to the stand protector 50 and finally into the collection container 60.

As illustrated in this figure, it is possible to use different objectives 70 which differ in their outer dimensions. In particular, some objectives 70 can be equipped with an auxiliary immersion set 75, which is fixed on a casing surface 72 of the objective 70, where it supports an immersion liquid tank, and which comprises a conduit for immersion liquid to a front area of the objective 70. In order to be able to fit such an auxiliary immersion set 75 on an objective 70, it is not possible for the objective protection ring 10 to enclose a portion of the casing surface 72 of the objective 70 that is any larger. In the illustrated example, the objective protection ring 10 is limited to a longitudinal area of at most 10% or at most 20% of the surface of the objective 70 in the axial direction starting from the mounting side of the objective 70. An auxiliary immersion set 75 can thus be readily installed on a casing surface 72 of one of the objectives 70. Moreover, control elements on a casing surface of an objective, such as correction ring, remain accessible. In addition, by means of this design, the revolver cover 30 merely has to be adapted to the objective revolver and its objective connections and not, or only marginally, to the shape of objectives 70 connected at any one time. In some cases, this may be seen as an advantage over a design as described, for example, in DE 20 2006 014 666 U1.

FIGS. 3, 4, 6 and 7

Figure 3:
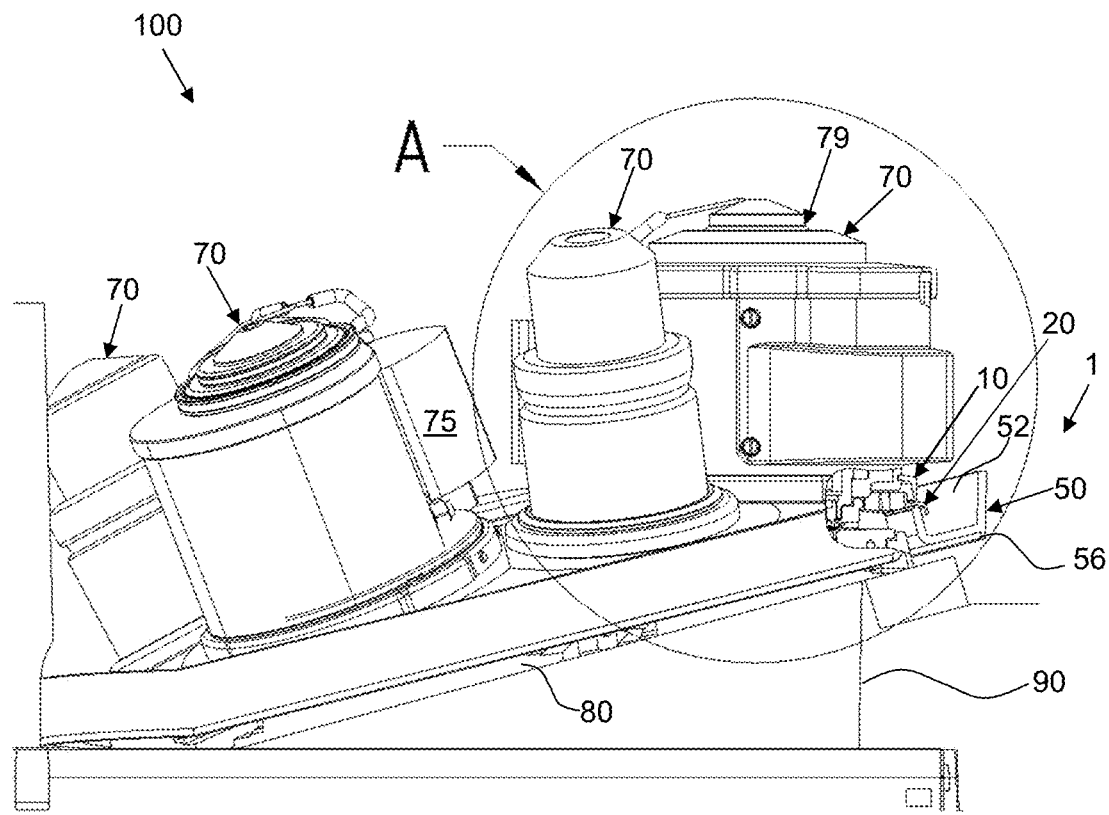
FIG. 3 shows a side view corresponding to FIG. 2.
Figure 6:
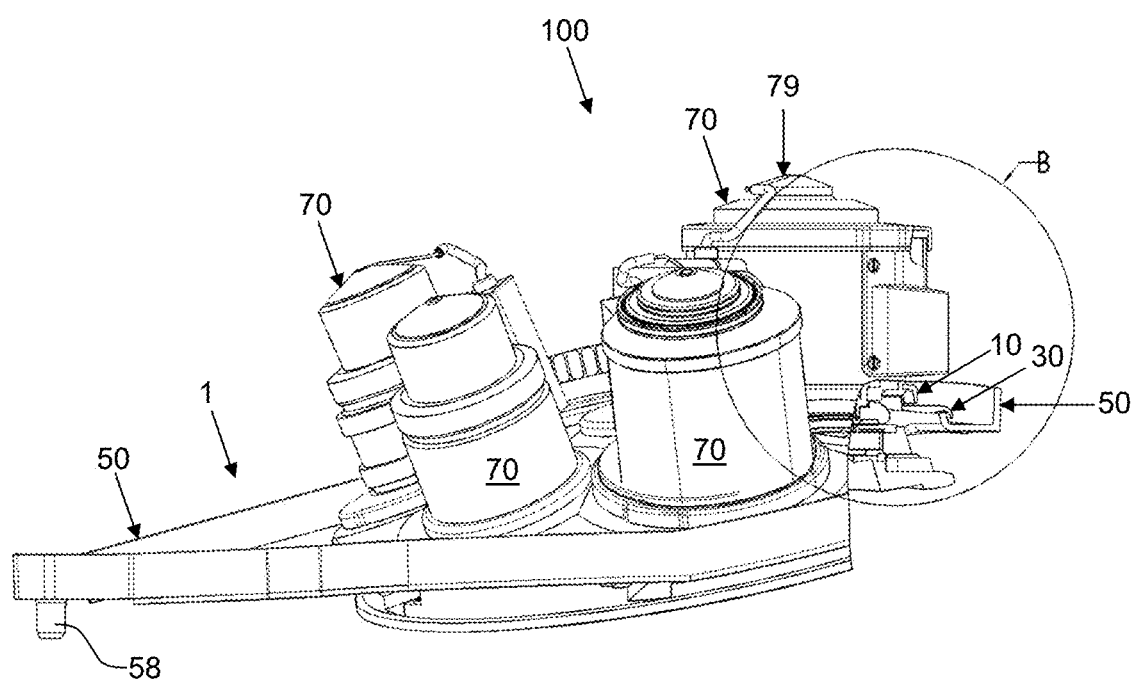
FIG. 6 shows a perspective sectional view corresponding to FIG. 5.

FIGS. 3 and 6 show perspective sectional views of the protective device 1 of FIGS. 1 and 2. Parts of a light microscope 100, in particular part of the stand 90 and of the objective revolver 80, are also visible. The objective revolver 80 is oriented at an incline, whereby the revolver cover 30 also has an inclined orientation and its drainage channel 52 is sloped for the drainage of a liquid.

The stand protector 50 protrudes radially (radially with respect to the optical axis of the microscope) beyond the stand 90. A downwards protruding drip edge 56 is formed on the underside of the stand protector 50 or rather on an outer edge of said underside in the illustrated example. The drip edge 56 also protrudes radially beyond the stand in order to protect the same from dripping liquid.

Figure 4:
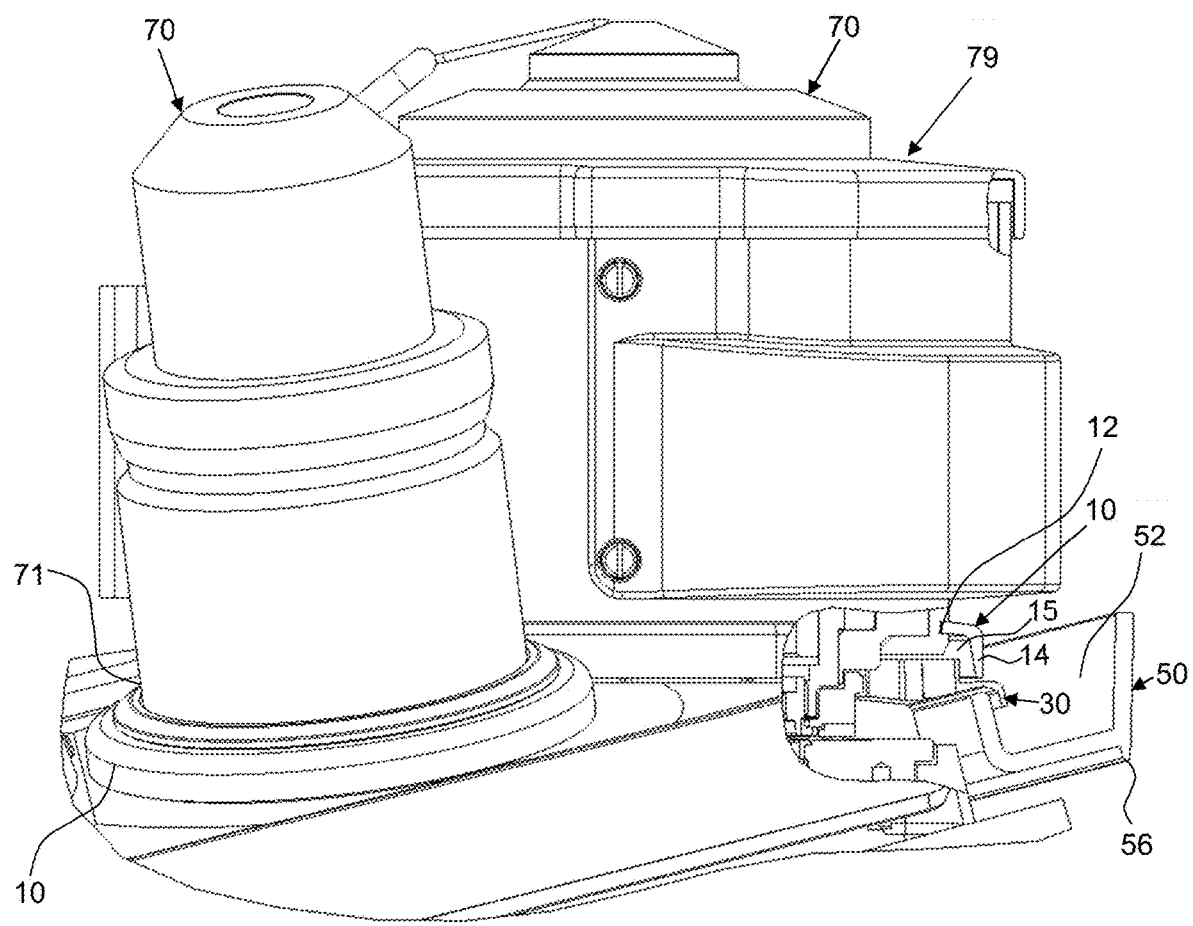
FIG. 4 shows an enlargement of a section of FIG. 3.

An enlargement of the area designated by A in FIG. 3 is shown in FIG. 4. An enlargement of the area designated by B in FIG. 6 is likewise shown in FIG. 7.

Figure 7:
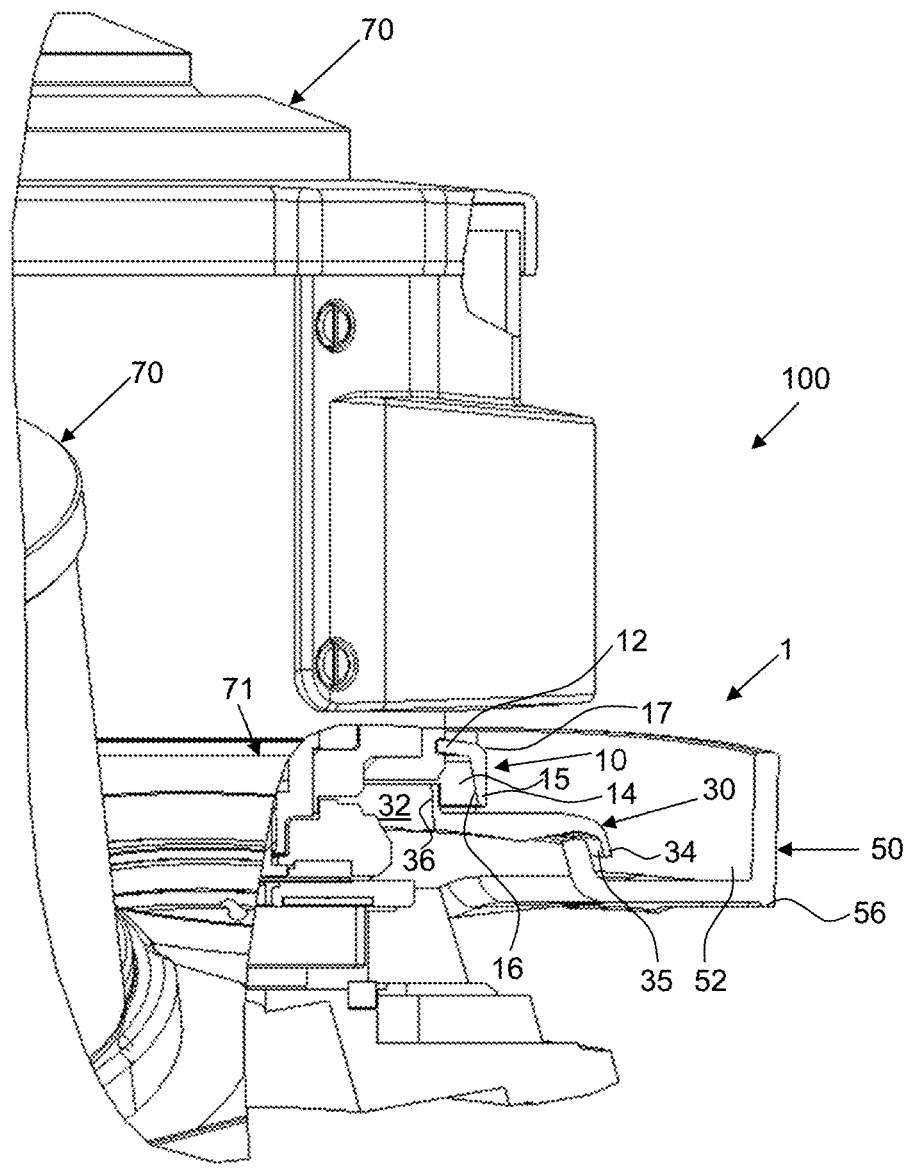
FIG. 7 shows an enlargement of a section of FIG. 6.
Figure 8:
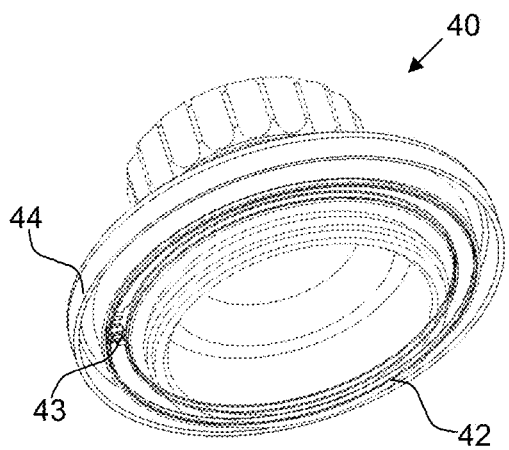
FIGS. 8 to 11 show different interface covers for a protective device of the invention.
Figure 9:
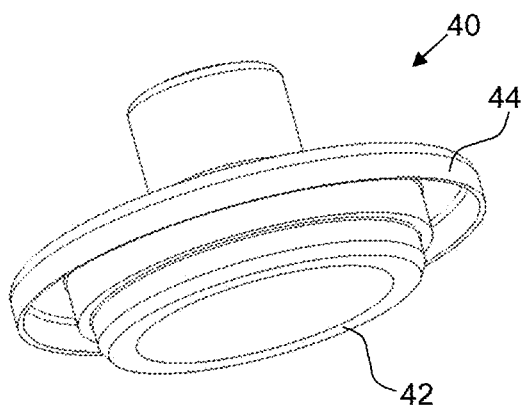
Figure 10:
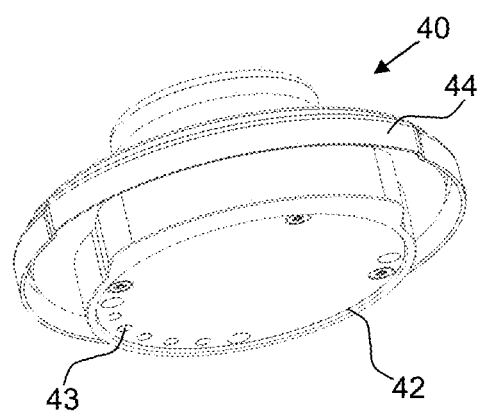
Figure 11:
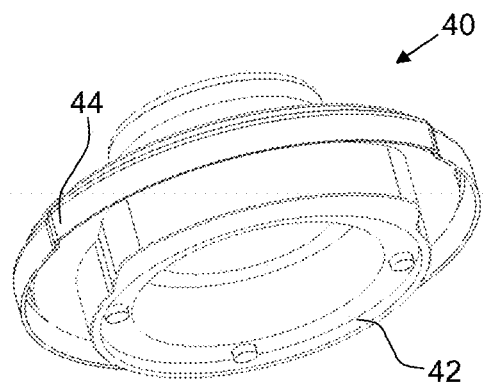

As illustrated in FIG. 4 and in greater detail in FIG. 7, an objective protection ring 10 is respectively mounted at a connecting end 71 of each objective 70. The objective protection ring 10 comprises a contact area 12 which fits against the objective 70 in a liquid-tight manner. The objective protection ring 10 extends from the contact area 12 radially outwards before curving downwards. An outer, lower end of the objective protection ring 10 is thus designated as the lower ring area 14 in the context of the present invention. Each objective protection ring 10 can be formed as one piece so that the contact area 12 and the lower ring area 14 designate different sections of the same ring.

The revolver cover 30 is located underneath the objective protection ring 10. The revolver cover 30 has a top side which extends under the lower ring area 14 inwards, i.e. in the direction of the center of the objective protection ring 10. The revolver cover 30 further has a collar (inner collar 36), which extends upwards, at each of its objective openings 32. A radius of the inner collar 36 is at least 0.5 mm smaller than a radius of the lower ring area 14. An annular free space 15 with a width (in a radial direction) of at least 0.5 mm is thus created between the inner collar 36 and the lower ring area 14. This free space 15 is relevant for reducing an ingress of moisture. The conventional approach is to try to create a contact that is as liquid-tight as possible between an objective protection ring and a revolver cover (cf. WO 2002 029 469 A1 or similarly in DE 20 2006 014 666 U1). With conventional designs, however, narrow gaps can form between an objective protector and the revolver cover during operation so that the capillary effect can pull a liquid into the gap. Consequently, if the seal is not completely liquid-tight, a liquid can get in. In contrast, a free space 15 that prevents a capillary effect is created in the embodiment according to the invention. By means of the relatively large width of the free space 15 of at least 0.5 mm, it is achieved that a liquid in the free space 15 either does not ascend or hardly ascends the walls of the free space 15. The height of the inner collar 36 with respect to the radial extension of the free space 15 is such that the capillary effect does not pull the liquid (e.g. oil, water or an aqueous solution) up to the upper edge of the inner collar 36 under standard conditions. This way, an ingress of liquid is prevented without an optimal precision being necessary at every point in the alignment of the protective device 1 in relation to the microscope components to be protected. For example, the inner collar 36 does not necessarily have to fit against the objective 70 or another microscope component in a liquid-tight manner. The dimensions and positioning of the objective protection ring 10 in relation to the revolver cover 30 also do not have to bring about a liquid-tight contact or be realized with an optimal precision in order to avoid an ingress of liquid. For example, should the free space 15 have a width that varies between, e.g., 0.5 mm and 6 mm, an ingress of liquid is nevertheless prevented by means of the free space 15. A lower end of the objective protection ring 10, i.e. of the lower ring area 14, can be located at a distance from the revolver cover 30 in the axial direction, wherein variations in said distance are likewise possible without an ingress of liquid occurring.

An optional hydrophobic coating is provided here on an inner side 16 of the objective protection ring 10. This also counteracts the capillary effect. An optional hydrophilic coating is further provided on the outer side 17 of the objective protection ring 10.

A liquid-tight contact between the revolver cover 30 and the stand protector 50 is in turn again not absolutely necessary for a drainage of liquid from the former to the latter. This is achieved, first, by a radial overlap. Moreover, an axial distance is provided at a location lying radially inwards relative to one or more drainage areas from the revolver cover 30 to the stand protector 50. In the example shown in FIG. 7, the revolver cover 30 further has an overhang 34 that slopes downwards in a radially outward direction. A drainage of liquid to the stand protector 50, namely into its drainage channel 52, occurs via said overhang 34. The overhang 34 protrudes radially over the stand protector 50, a gap 35 being formed under the overhang 34 in the inward direction. The gap 35 is limited in the inward direction by an upwardly protruding inner collar of the stand protector 50. A contact between the revolver cover 30 and the stand protector 50 in the axial direction in the area of the gap 35, on the other hand, is not necessary. Similar to the free space 15 described above, the gap 35 ensures that liquid does not enter between the stand protector 50 and the revolver cover 30 due to capillary effects. Selected dimensions of the gap 35 can be similar to those of the free space 15 or greater. This design thus does not provide a gapless connection at drainage areas from the revolver cover 30 to the stand protector 50 in contrast to, for example, WO 2002 029 469 A1, in which a stand protector, designated there as a collar, terminates exactly at the edge of a revolver cover, designated there as a flexible cover or coat.

FIG. 5

Figure 5:
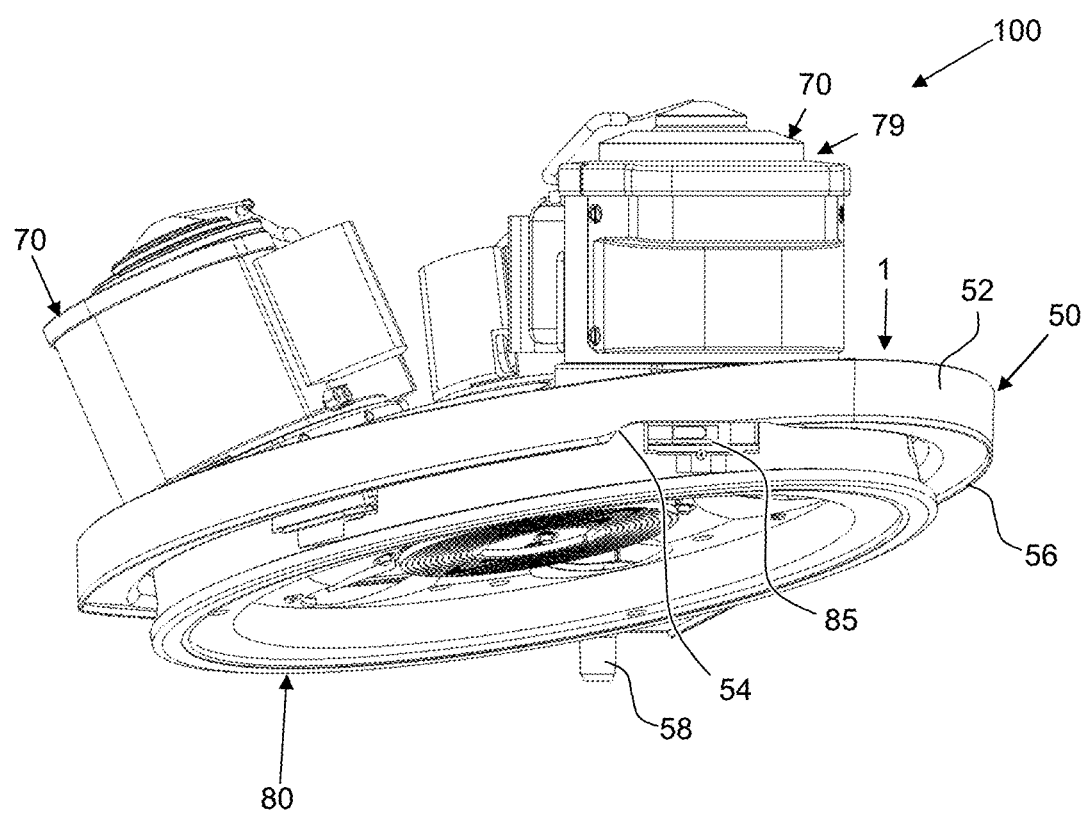
FIG. 5 shows a further perspective illustration of an example embodiment of a protective device in accordance with the invention.

FIG. 5 shows a perspective oblique view of parts of a microscope 100 with a protective device 1 as shown in the preceding figures. Of the plurality of provided objectives 70, the currently active objective 79 is located at the uppermost position due to the inclined orientation of the objective revolver 80. The drainage channel 52 of the stand protector 50 next to this uppermost position will thus necessarily conduct less liquid during operation than the lower sections of the drainage channel 52. The drainage channel 52 adjacent to the uppermost position of the objective revolver 80 can consequently be shallower. The stand protector 50 can thus comprise a recess 54 on its radially outer side. The stand protector 50 has a shorter axial extension in the area of the recess 54 compared to other areas. Accessibility of microscope components underneath the currently active objective 79 is thus improved. For example, access to a DIC slot 85 for the currently active objective 79 is improved. It is thus easier for a DIC slide to be inserted and removed without a user having to move the protective device 1 for this purpose. A drip edge 56 in the area of the DIC slot 85 can be shorter or interrupted in order to further improve access to the DIC slot 85.

FIGS. 8 to 11

FIGS. 8 to 11 respectively show interface covers 40 for revolver positions of the objective revolver that are not in use. If an objective is not used at a revolver position, the corresponding objective opening 32 of the revolver cover 30 is not protected from liquid by means of an objective protection ring 10, but by one of the interface covers 40. The interface covers 40 shown differ in particular with respect to their size, shape and/or their mounting area 42. The interface covers 40 of FIGS. 8 and 9 comprise a threaded mounting area 42 for mounting at a threaded revolver position. In contrast, the interface cover 40 of FIG. 10 comprises a mounting area 42 in the form of a bayonet connector while the interface cover 40 of FIG. 11 comprises a mounting area 42 in the form of a bayonet mount. The interface covers 40 of FIGS. 8 and 10 further have electrical contacts 43 via which a reading of data is possible, for example for an automatic component recognition (ACR). In alternative designs, the interface covers can be simply placed over the corresponding opening and held by, e.g., magnets. A thread can be omitted in this case and a particularly quick and easy installation is possible.

The interface covers 40 comprise an overhang area 44, which projects out radially over the mounting area 42. An annular free space analogous to the free space 15 of the objective protection ring 10 described above is created between the overhang area 44 and the mounting area 42. The overhang area 44 protrudes radially before extending in an axial direction or in a direction with an axial component downwards, i.e. in the direction of the revolver cover 30. A lower edge of the overhang area 44 can be at a distance from the revolver cover 30 here, the revolver cover 30 extending inwards under the overhang area 44 and forming the above-described inner collar there. Via this design, the interface covers 40 prevent an entry of liquid through an objective opening 32 of the revolver cover 30 particularly reliably.

Figure 12:
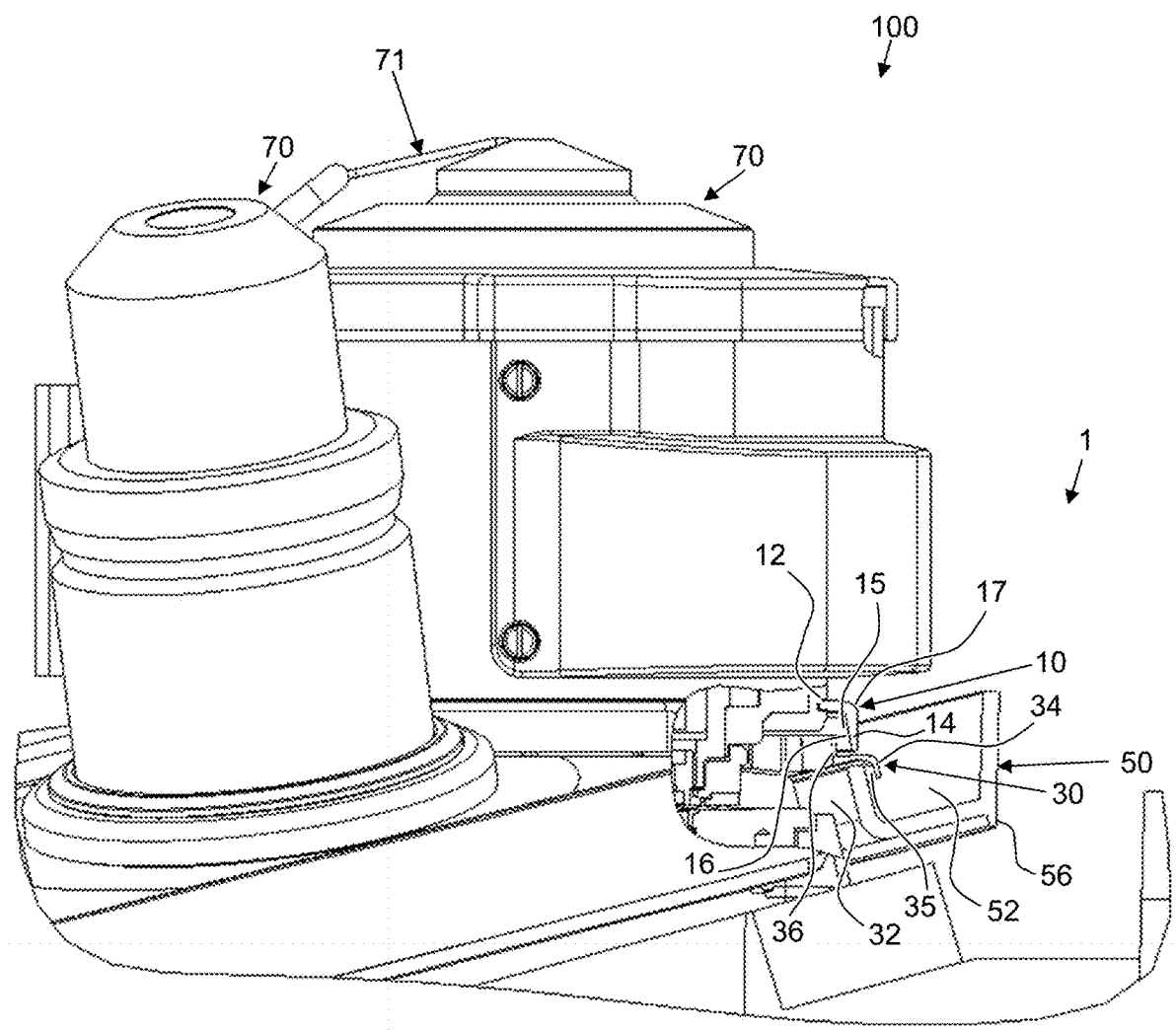
FIG. 12 shows a further perspective illustration of an example embodiment of a protective device in accordance with the invention.
Figure 13:
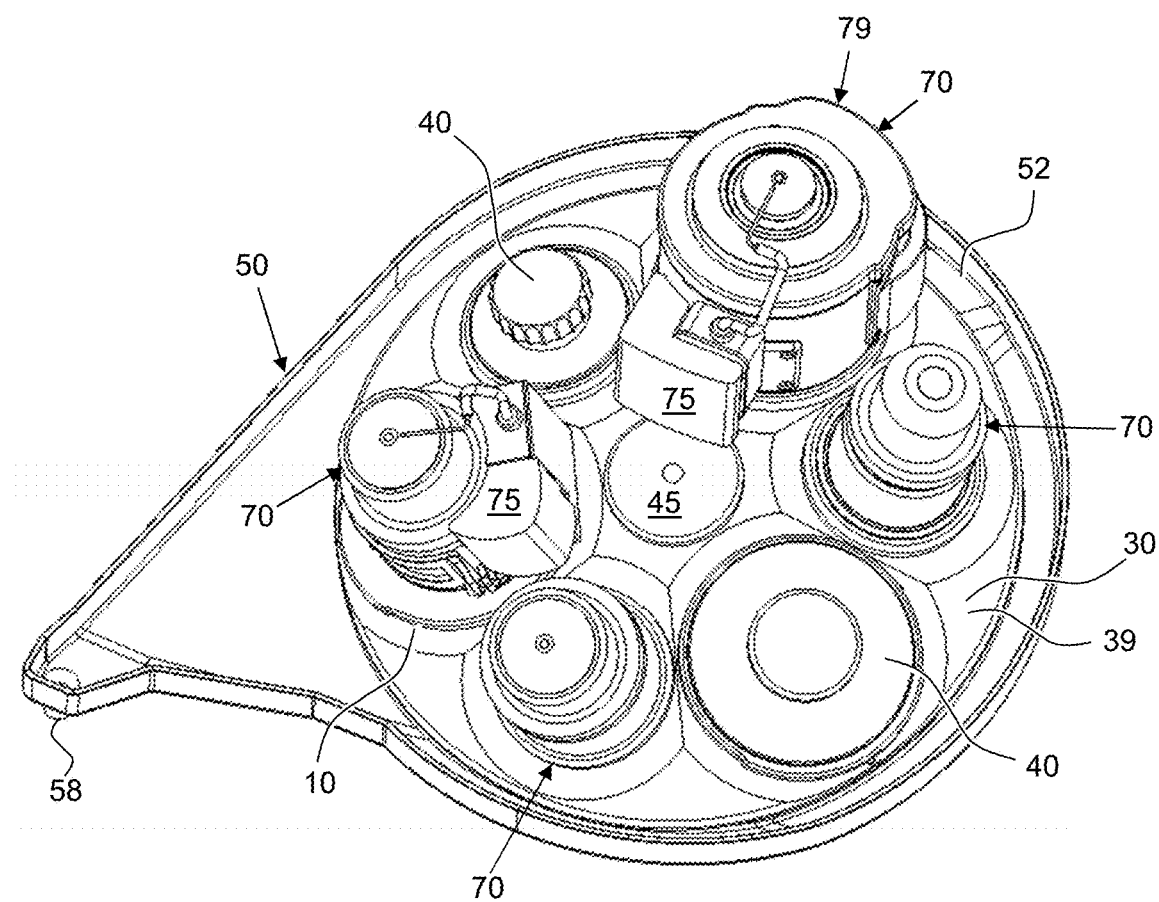
FIG. 13 shows a perspective view corresponding to FIG. 12.

FIGS. 12 and 13

FIG. 13 is a perspective view of the protective device 1 and parts of the microscope 100, similar to FIG. 2. FIG. 12 shows a corresponding enlarged sectional view, similar to FIG. 7. FIG. 13 differs from FIG. 2 in that the revolver positions are equipped differently. In the illustrated state, four revolver positions are occupied by objectives 70 while two revolver positions are respectively covered with the interface covers 40 of FIGS. 8 and 10.

During assembly, the objective protection ring 10 is first mounted on the objective 70 while the revolver cover 30 is mounted on the objective revolver. The objective 70 is then mounted together with the objective protection ring 10 on the objective revolver equipped with the revolver cover 30. The protective device disclosed in DE 20 2006 014 666 U1 known as Aquastop, in contrast, is only attached when the objectives are already mounted on the objective revolver; in this case, however, it is not possible to use further auxiliary components on the objectives such as, for example, the auxiliary immersion sets 75 shown in FIG. 13.

FIGS. 14 to 16

FIGS. 14 and 15 show an immersion objective/objective 70 as used in the embodiments of the figures described above. The objective 70 is equipped with an auxiliary immersion set 75, which is mounted on a casing surface 72 of the objective 70. The auxiliary immersion set 75 comprises an immersion liquid tank 77, a pump and an immersion liquid conduit 78, which leads to a front lens of the objective 70. For its electrical control and power supply, the auxiliary immersion set 75 comprises electrical conductors 76 guided on the outer sleeve or casing surface 72 of the objective 70. The electrical conductors 76 can contact electrical contacts of, for example, a bayonet connector of the objective 70.

An objective protection ring 10 is shaped in a manner that it can accommodate the electrical conductors 76 on the outer sleeve of the objective 10, as shown in FIG. 16. The objective protection ring 10 depicted in this figure comprises an inner opening 18 with an indentation 19 the shape of which is adapted to parts of the auxiliary immersion set 75, in particular its electrical conductors 76. Such an indentation 19 can also be provided for other electrified accessory units on the objective 70 besides the auxiliary immersion set 75.

It is noted for the sake of clarity that a section through in particular the objective protection ring 10 and the electrical conductors 76 is depicted in the lower left area of FIG. 15 for better visibility.

Figure 17:
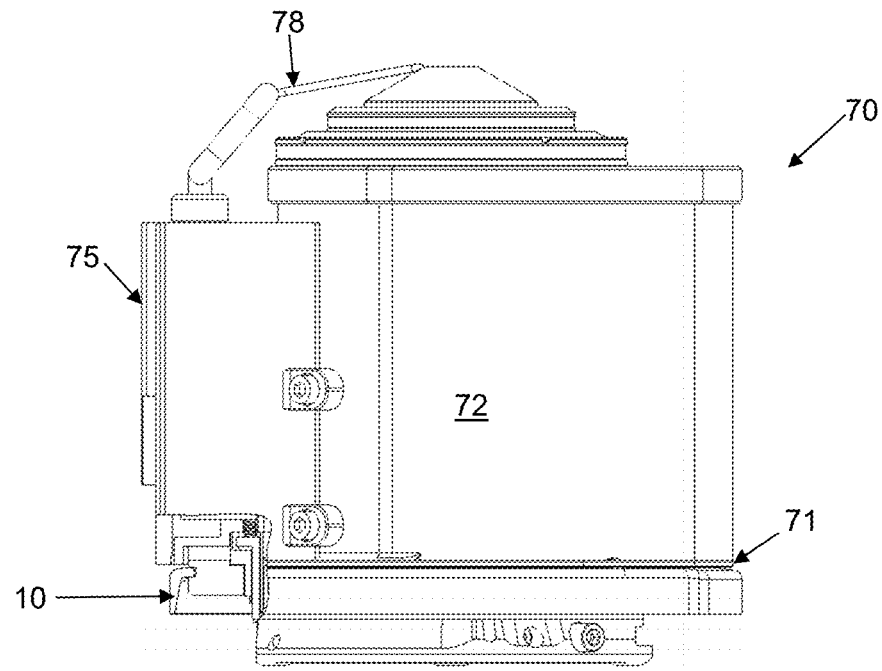
FIG. 17 shows a side view of a further objective of an example embodiment of a microscope in accordance with the invention.
Figure 18:
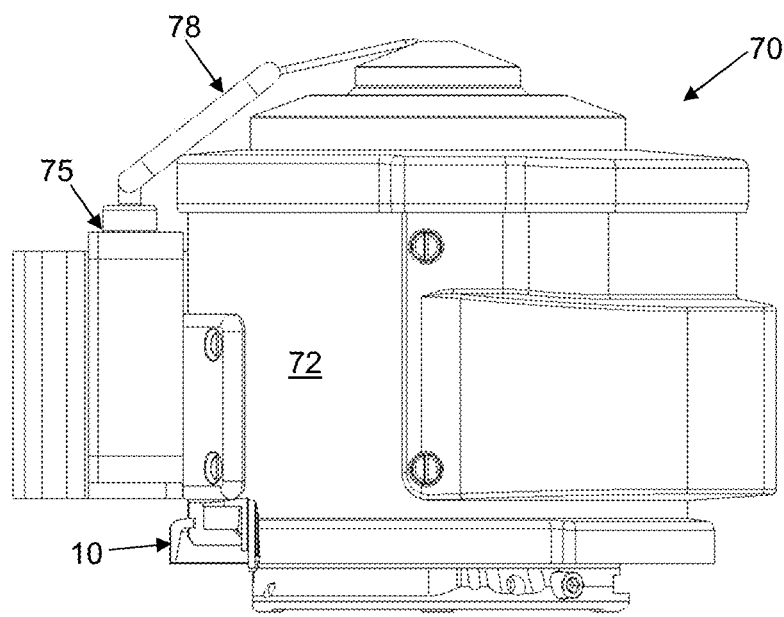
FIG. 18 shows a side view of a further objective of an example embodiment of a microscope in accordance with the invention.

FIGS. 17 and 18

FIG. 17 shows an objective 70 with an auxiliary immersion set 75 and an objective protection ring 10. In contrast to the preceding figure, the objective 70 depicted here is a zoom objective inside which certain optical elements are adjustable by a motor.

FIG. 18 shows a further objective 70 with an auxiliary immersion set 75 and an objective protection ring 10. In contrast to the two preceding figures, the depicted objective is an autocorr objective in which lenses for, for example, a slide thickness correction are adjustable by a motor.

Joints, for example between the front lens and the lens frame or between the lens frame and the sleeve, can be sealed in all objectives 70 by a sealing material, for example by means of adhesive sealant.

Moveable joints can also be provided on the objective 70, e.g. at the area between the slide protector on the objective front side and the stationary objective body. A superstructure extending around the circumference of the objective and comprising a circumferential inner gap can be provided in this case. The gap width here can be greater than or equal to 0.25 mm.

Example Embodiments of FIGS. 19 to 22

A further example embodiment of a microscope 100 with a protective device 1 in accordance with the invention is shown in FIGS. 19 to 22.

Figure 19:
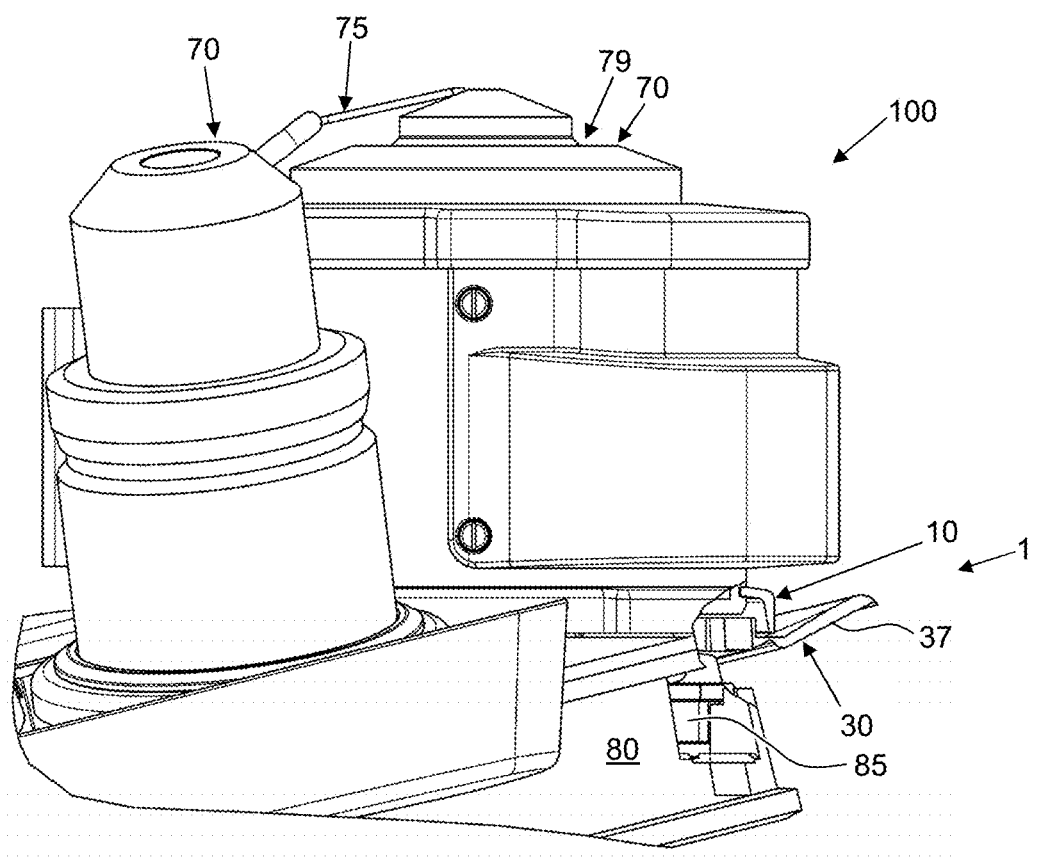
FIG. 19 shows a perspective view of a section of a further example embodiment of a protective device and of a microscope in accordance with the invention.

FIG. 19 is a side view, a section through components of the protective device 1 and the objective revolver 80 being shown in the area on the right. This section extends through the uppermost objective 79 of the objectives 70, which is located in the optical path of the microscope.

In contrast to the preceding descriptions, the radially protruding part of the revolver cover 30 is not formed so as to slope downwards here, but rather comprises a collar (outer collar) 37 that rises upwards. That is to say that the outer collar 37 forms an angle with the rest of the revolver cover 30 in the direction of the objectives 70 and not in the direction of the underside of the revolver cover 30. liquid from the revolver cover 30 thus does not flow radially outwards directly to the stand protector 50. Rather, the outer collar 37 forms a groove in which liquid first flows along a path in the shape of a ring segment around the objective revolver 80 before being conducted into the drainage channel of the stand protector 50.

Figure 20:
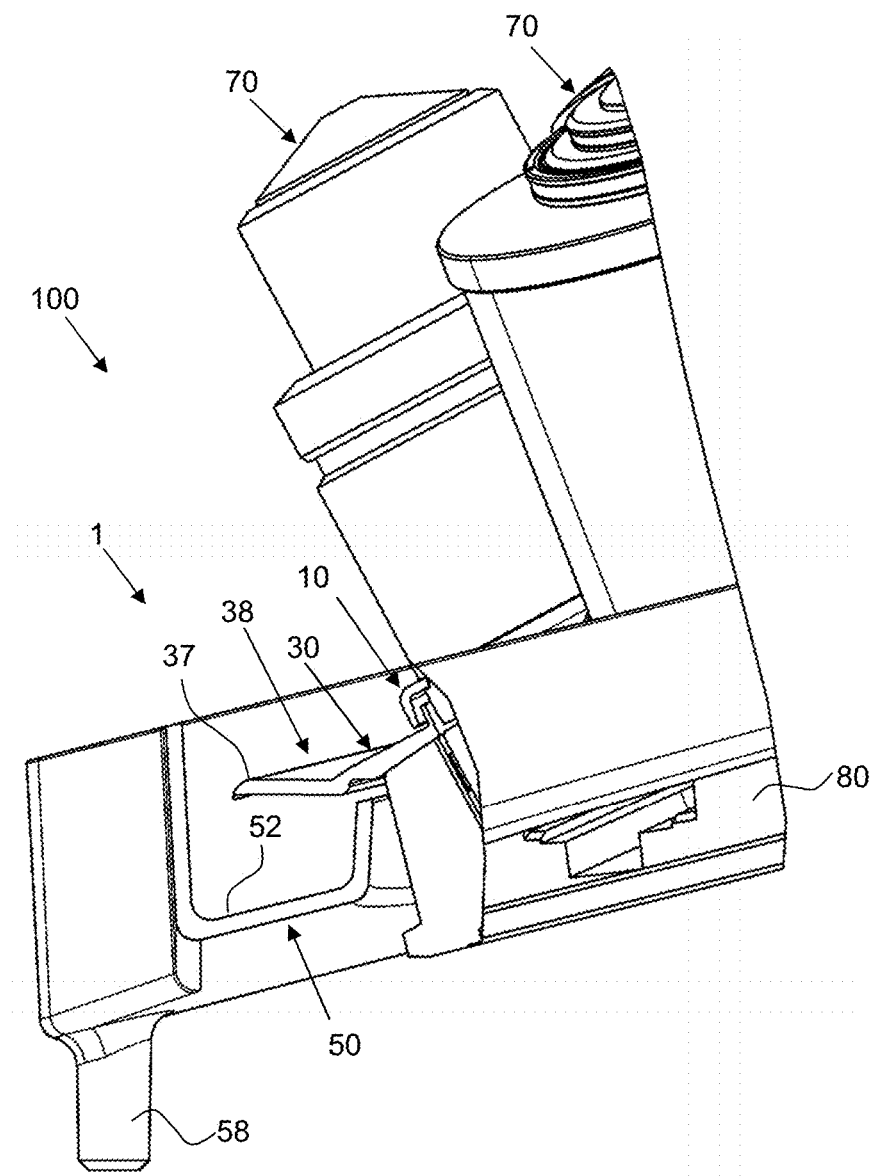
FIG. 20 shows a further section of the protective device and of the microscope of FIG. 19.

This is illustrated in the enlarged sectional view in FIG. 20. A section around the currently lowermost point 38 of the revolver cover 30 is depicted. As described in the foregoing, the area lying opposite the objective 79 that is currently in the optical path of the microscope is located at the lowermost point due to the inclined orientation of the objective revolver 80. As a result of the inclined orientation of the objective revolver 80, the extension of the outer collar 37 at the lowermost point 38 is relatively flat so that liquid can flow outwards over the outer collar 37 more readily there. By means of this design, it is achieved that liquid is drained essentially solely at the lowermost point 38 of the revolver cover 30. The drainage channel 52 thus does not have to run completely around the revolver cover 30. While the drainage channel 52 protrudes radially beyond the outer collar 37 at the lowermost point 38 (FIG. 20), the drainage channel can be interrupted or omitted at the uppermost point (FIG. 19). A resulting effect may be an improved accessibility of the area under the revolver cover 30 below the objective 79 that is currently optically active. As shown in FIG. 19, access in particular to a DIC slot 85 can be improved.

Figure 21:
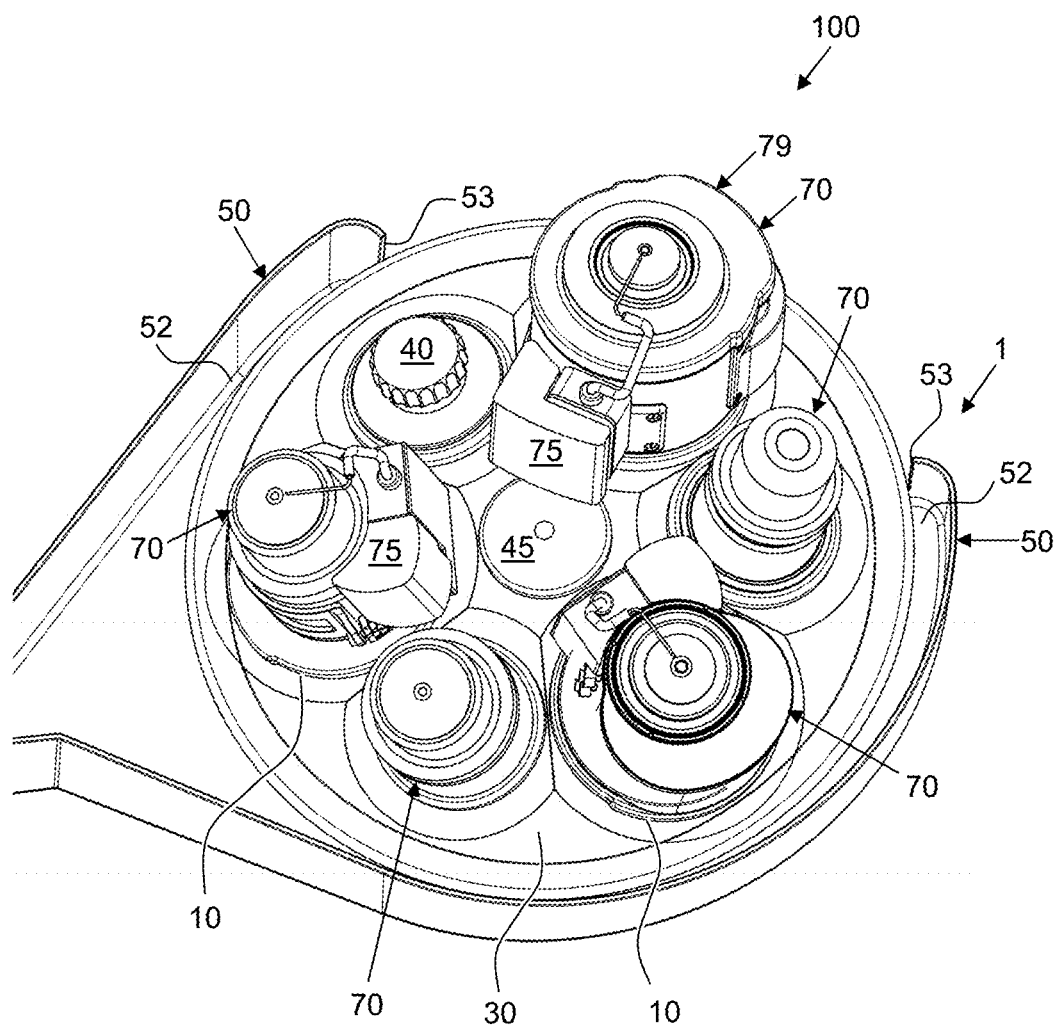
FIG. 21 shows a perspective view of the protective device and of the microscope of FIGS. 19 and 20.
Figure 22:
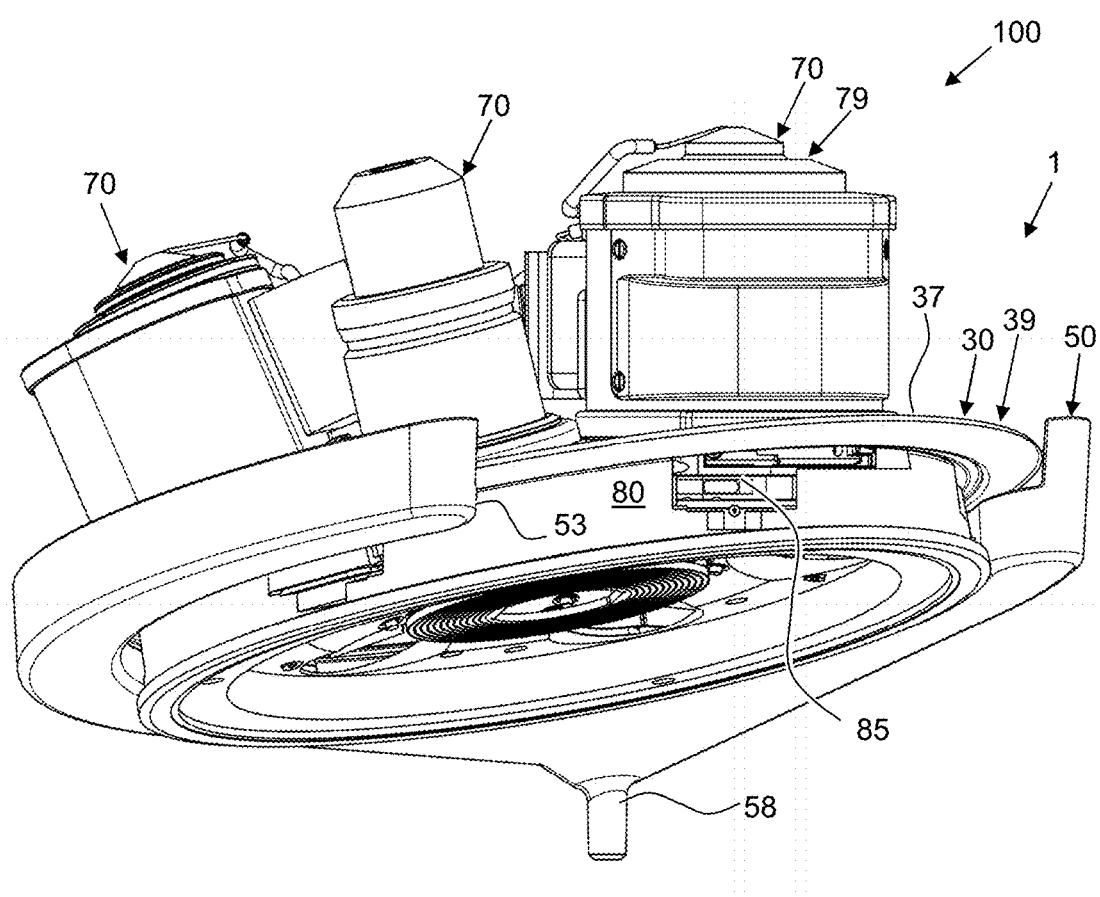
FIG. 22 shows a perspective side view corresponding to FIG. 21.

FIG. 21 shows a perspective top view corresponding to the previous two figures while FIG. 22 shows a perspective side view of the uppermost side of the objective revolver 80. The interruption 53 of the drainage channel 52 next to the optically active objective 79 is visible. The drainage channel 52 thus consists of two separate grooves, which respectively comprise a section in the shape of a ring segment and lead to the drain 58.

In the depicted example embodiments described in the foregoing, the revolver cover 30 is used as an example of an objective-changer cover 39. In variants of these example embodiments, the microscope can comprise an objective changer other than an objective revolver. In such cases, instead of the revolver cover 30, an objective-changer cover 39 is provided, the shape of which is optionally adapted to the objective changer so as to cover its top side and protrude laterally. In further variants, the microscope comprises neither an objective revolver nor an objective changer of any other design. In these cases, the revolver cover 30/objective-changer cover 39 described above can be omitted, whereby the objective protection ring 10 is directly adjacent to the stand protector 50. The free space 15 can then be formed between the objective protection ring 10 and the stand protector 50.

A very efficient protection from liquids can be provided with the example embodiments described in the foregoing. The operability and accessibility of microscope components in these embodiments is particularly good. The variants illustrated and described are intended to be understood as purely illustrative. In particular, the arrangements of objectives or interface covers are purely illustrative and different arrangements of such equipment can be selected for operation. Elements of different figures can also be combined with one another. To facilitate an understanding of the invention, the protective device was depicted with an inverted light microscope. However, a protective device is also claimed separately in accordance with the attached claims. Elastic sealing elements, for example rubber gaskets, can be added at different locations. The components described or shown in the figures are not to be understood as an exhaustive or complete indication of all elements of the protective device. Variations of the illustrated example embodiments are possible within the framework of the attached claims.

LIST OF REFERENCES

1 Protective device
10 Objective protection ring
12 Contact area of the objective protection ring
14 Lower ring area of the objective protection ring
Free space
16 Inner side of the lower ring area
17 Outer side of the objective protection ring
18 Central opening of the objective protection ring
19 Indentation in the objective protection ring for the auxiliary immersion set
30 Revolver cover
31 Rotation-axis opening of the revolver cover
32 Objective opening of the revolver cover
34 Overhang of the revolver cover
35 Gap
36 Inner collar of the revolver cover
37 Outer collar of the revolver cover
38 Lowermost side of the outer collar/of the revolver cover
39 Objective-changer cover
40 Interface cover for revolver positions not in use
42 Mounting area of the interface cover
43 Electrical contacts of the interface cover
44 Overhang area of the interface cover
45 Rotation-axis cover
50 Stand protector
51 Opening of the stand protector
52 Drainage channel of the stand protector
53 Interruption of the drainage channel
54 Recess of the stand protector
56 Drip edge of the stand protector
58 Drain of the stand protector
59 Drain tube to the collection container
60 Collection container
70 Objective
71 Connecting end of the objective
72 Casing surface of the objective 75 Auxiliary immersion set
76 Electrical conductors of the auxiliary immersion set
77 Immersion liquid tank
78 Immersion liquid conduit
79 Optically active objective
80 Objective revolver
85 DIC slot
90 Stand
100 Microscope

We claim:

1. A protective device for protecting microscope components from contact with a liquid, comprising:
an objective protection ring for arrangement around an objective, wherein the objective protection ring comprises an annular contact area for contacting the objective; and
a stand protector with a drainage channel for draining a liquid;
wherein the objective protection ring comprises a lower ring area located below the contact area and protruding further outwards radially than the contact area so as to form a free space in an inward direction; and
wherein, in order to reduce an ingress of liquid via a capillary effect, a radial dimension of the free space is greater than or equal to 0.5 mm.

2. The protective device of claim 1,
wherein, in a mounted state, the free space runs in an annular fashion around an entire circumference of the objective so as to prevent the capillary effect.

3. The protective device of claim 1,
wherein an objective-changer cover or the stand protector comprises at least one objective opening for an objective and includes an inner collar at each objective opening, wherein the inner collar delimits a portion of the free space in a mounted state.

4. The protective device of claim 1,
wherein the radial dimension of the free space is greater than an axial distance between the objective protection ring and an objective-changer cover, or, in cases where an objective-changer cover is not provided, between the objective protection ring and the stand protector.

5. A microscope with a stand, at least one objective and the protective device defined in claim 1.

6. The microscope of claim 5,
wherein the objective protection ring extends around the objective at its connecting end and otherwise leaves a casing surface of the objective free.

7. The microscope of claim 5,
wherein the stand protector is arranged so that a recess or a circumferential interruption of the drainage channel lies next to the objective located in an optical path of the microscope.

8. A protective device for protecting microscope components from contact with a liquid, comprising:
an objective protection ring for arrangement around an objective, wherein the objective protection ring comprises an annular contact area for contacting the objective; and
a stand protector with a drainage channel for draining a liquid;
wherein the objective protection ring comprises a lower ring area located below the contact area and protruding further outwards radially than the contact area so as to form a free space in an inward direction; and
wherein the protective device further comprises an objective-changer cover for arrangement on an objective changer.

9. The protective device of claim 8,
wherein the objective protection ring is arranged at a distance from the objective-changer cover in order to reduce an ingress of liquid via a capillary effect.

10. The protective device of claim 8,
wherein the objective protection ring comprises a hydrophobic coating on an inner side of the lower ring area and a hydrophilic coating at least on parts of its outer side.

11. The protective device of claim 8,
wherein the objective changer is an objective revolver or an objective slider; and
wherein the objective-changer cover is a revolver cover or an objective-slider cover for arrangement on the objective revolver or the objective slider.

12. The protective device of claim 11,
wherein at least one of the objective protection ring, the revolver cover, or the stand protector, comprises electrically conductive parts for electromagnetic shielding.

13. The protective device of claim 11,
wherein the revolver cover is configured with an overhang relative to the stand protector, wherein the overhang forms an annular gap between the revolver cover and the stand protector in order to prevent an ingress of liquid via a capillary effect.

14. The protective device of claim 11,
wherein the revolver cover has, in a radially outward direction, an outer collar that projects upwards, wherein, in a mounted state on an inclined objective revolver, the outer collar causes a draining of liquid at a lowermost side of the revolver cover.

15. The protective device of claim 11,
wherein the revolver cover has a hydrophobic coating in areas that delimit portions of the free space; and
wherein the revolver cover at least partially comprises a hydrophilic coating on its outer side for conducting a liquid from the objective protection ring to the stand protector.

16. The protective device of claim 8,
wherein, for an improved accessibility of a differential interference contrast (DIC) slot, the stand protector comprises a recess with a reduced depth of the drainage channel or a circumferential interruption on a side which lies opposite a lowermost side of the revolver cover or lies opposite a side of the stand protector on which the stand protector comprises a drain;
wherein the stand protector has, on its underside, a drip edge, which is shorter in an area of the recess;
the protective device further comprising a collection container which is fluidly connected to the drain of the stand protector.

17. The protective device of claim 8,
comprising an interface cover fixable at an objective opening of the objective-changer cover when an objective is not in use at the objective opening;
wherein the interface cover comprises a mounting area which engages the objective opening in a mounted state;
wherein the interface cover comprises an overhang area which extends upwards from the objective opening, projects radially over the mounting area and is located at a distance from the objective-changer cover in the mounted state;
wherein the interface cover comprises electrical contacts for connecting to contacts of the objective changer, wherein the interface cover comprises a memory with identification data that can be read via the electrical contacts.

18. A protective device for protecting microscope components from contact with a liquid, comprising:
an objective protection ring for arrangement around an objective, wherein the objective protection ring comprises an annular contact area for contacting the objective; and
a stand protector with a drainage channel for draining a liquid;
wherein the objective protection ring comprises a lower ring area located below the contact area and protruding further outwards radially than the contact area so as to form a free space in an inward direction; and
wherein an objective-changer cover extends under the objective protection ring further in a direction of a centre of the objective protection ring than the lower ring area of the objective protection ring,
or, in cases where an objective-changer cover is not provided, wherein the stand protector extends under the objective protection ring further in the direction of the centre of the objective protection ring than the lower ring area of the objective protection ring.

19. A method for protecting microscope components from contact with a liquid, including:
arranging an objective protection ring around an objective, wherein the objective protection ring contacts the objective with an annular contact area; and
arranging a stand protector on a stand of a microscope, wherein the stand protector comprises a drainage channel for draining a liquid;
wherein the objective protection ring comprises a lower ring area located below the contact area and protruding further outwards radially than the contact area so as to form a free space in an inward direction; and
wherein an objective-changer cover or the stand protector comprises at least one objective opening for the objective and includes an inner collar at each objective opening, wherein the inner collar delimits a portion of the free space in a mounted state.

20. The method of claim 19,
wherein, in order to reduce an ingress of liquid via a capillary effect, a radial dimension of the free space is greater than or equal to 0.5 mm.

* * * * *